US012655681B2

(12) United States Patent
Zarbeck et al.

(10) Patent No.: US 12,655,681 B2
(45) Date of Patent: Jun. 16, 2026

(54) ROLLING SHUTTER MODULAR UTILITY SLAT

(71) Applicant: Qualitas Manufacturing Incorporated, Itasca, IL (US)

(72) Inventors: Craig N. Zarbeck, Stevensville, MI (US); Orlando Amil, Chicago, IL (US)

(73) Assignee: Qualitas Manufacturing Incorporated, Itasca, IL (US)

(*) Notice: Subject to any disclaimer, the term of this patent is extended or adjusted under 35 U.S.C. 154(b) by 231 days.

(21) Appl. No.: 17/839,229

(22) Filed: Jun. 13, 2022

(65) Prior Publication Data

US 2022/0396997 A1 Dec. 15, 2022

Related U.S. Application Data

(60) Provisional application No. 63/233,714, filed on Aug. 16, 2021, provisional application No. 63/210,461, filed on Jun. 14, 2021.

(51) Int. Cl.
*E06B 9/15* (2006.01)
*E05B 65/00* (2006.01)

(52) U.S. Cl.
CPC ............ *E06B 9/15* (2013.01); *E05B 65/0021* (2013.01); *E06B 2009/1505* (2013.01); *E06B 2009/1544* (2013.01)

(58) Field of Classification Search
CPC ...... E06B 9/15; E06B 9/11; E06B 2009/1505; E06B 2009/1544; E06B 9/17046; E06B 2009/1572; E05B 65/0021
See application file for complete search history.

(56) References Cited

U.S. PATENT DOCUMENTS

| | | | | | |
|---|---|---|---|---|---|
| 1,352,656 | A * | 9/1920 | Cahill | E06B 9/17 | 160/237 |
| 2,390,116 | A * | 12/1945 | Michelman | E06B 9/15 | 160/133 |
| 4,382,460 | A * | 5/1983 | Ben-Tal | E06B 7/084 | 160/236 |
| 4,416,047 | A * | 11/1983 | Riexinger | B26F 1/18 | 29/445 |
| 4,467,853 | A * | 8/1984 | Downey, Jr. | E06B 9/581 | 160/133 |

(Continued)

FOREIGN PATENT DOCUMENTS

| | | |
|---|---|---|
| BE | 897193 A | 11/1983 |
| DE | 7605469 U1 | 8/1976 |

(Continued)

OTHER PUBLICATIONS

Alulux, "Qompact roller shutters", catalog (Mar. 2020).

(Continued)

*Primary Examiner* — Johnnie A. Shablack
*Assistant Examiner* — Matthew R. Shepherd
(74) *Attorney, Agent, or Firm* — Ice Miller LLP

(57) ABSTRACT

A utility slat for a rolling shutter comprises a single-walled slat body with a U-shaped channel formed in the slat body that defines an interior space for receiving additional features, such as a rolling shutter locking device. A cover is removably coupled to the slat body to enclose the interior space.

14 Claims, 23 Drawing Sheets

(56) References Cited

U.S. PATENT DOCUMENTS

| | | | | | |
|---|---|---|---|---|---|
| 4,536,929 | A * | 8/1985 | Riexinger sen | E06B 9/15 29/788 |
| 4,628,982 | A * | 12/1986 | Labelle | E06B 9/15 160/235 |
| 4,630,664 | A * | 12/1986 | Magro | E06B 9/15 160/232 |
| 4,748,783 | A * | 6/1988 | Labelle | E06B 9/15 52/592.4 |
| 4,929,862 | A * | 5/1990 | Hamilton | E06B 9/115 312/297 |
| 4,979,553 | A * | 12/1990 | Lowry, III | E06B 9/165 160/133 |
| 5,322,108 | A * | 6/1994 | Hoffman | E06B 9/165 160/235 |
| 5,687,785 | A * | 11/1997 | Erber | E06B 9/386 160/232 |
| 6,085,822 | A | 7/2000 | Miller | |
| 6,119,759 | A * | 9/2000 | Assaad | E06B 9/34 160/310 |
| 7,328,613 | B2 * | 2/2008 | Volkel | E06B 9/15 160/235 |
| 7,389,615 | B1 * | 6/2008 | Kelley | E06B 9/02 248/231.9 |
| 8,191,602 | B1 * | 6/2012 | Motosko | E06B 9/15 160/180 |
| 8,365,801 | B1 * | 2/2013 | Motosko | E06B 9/15 160/133 |
| 8,584,731 | B1 * | 11/2013 | Konrad | E06B 9/15 160/133 |
| 8,616,261 | B2 | 12/2013 | Miller | |
| 8,925,617 | B2 | 1/2015 | Miller | |
| 8,944,137 | B2 | 2/2015 | Miller | |
| 9,074,411 | B2 | 7/2015 | Miller et al. | |
| 12,024,927 | B2 * | 7/2024 | Burns | B60J 5/08 |
| 2003/0024659 | A1 * | 2/2003 | Begni | E06B 9/581 160/235 |
| 2004/0207211 | A1 * | 10/2004 | Jeffries | E05B 65/0021 292/215 |
| 2007/0006980 | A1 | 1/2007 | Zabala et al. | |
| 2013/0048231 | A1 * | 2/2013 | Miller | E06B 9/15 160/133 |
| 2014/0053991 | A1 | 2/2014 | Miller et al. | |
| 2015/0135782 | A1 * | 5/2015 | Sadler | E05C 3/30 70/344 |
| 2019/0390516 | A1 * | 12/2019 | Miller | E06B 9/15 |
| 2019/0390517 | A1 * | 12/2019 | Miller | E06B 9/86 |
| 2020/0284090 | A1 * | 9/2020 | Schulman | E06B 9/325 |

FOREIGN PATENT DOCUMENTS

| | | | |
|---|---|---|---|
| DE | 4325121 | A1 | 2/1995 |
| FR | 1442078 | A | 6/1966 |

OTHER PUBLICATIONS

Int'l Appl'n No. PCT/US22/33311, Search Report, Written Opinion, Sep. 8, 2022.

European Patent Application No. 22825615.2, Search Report (May 20, 2025).

* cited by examiner

ROLLING SHUTTER MODULAR UTILITY SLAT

This application claims the benefit of U.S. Provisional Application No. 63/210,461, filed on Jun. 14, 2021, and U.S. Provisional Application No. 63/233,714, filed on Aug. 16, 2021, which are hereby incorporated by reference in their entirety.

BACKGROUND OF THE INVENTION

The present invention relates to rolling shutter systems and, in particular, to the configurations of the slats for a rolling shutter system.

Rolling shutter systems comprise a series of slats that are linked together to form an articulated curtain that covers an opening of a structure, such as a doorway or window. The slats typically span the width of the opening, and have an upper edge with a hook-shaped engaging track, and a lower edge with a receiving track that forms a pocket for receiving the engaging track of another slat. The slats are linked by the slidable engagement of the engaging track of a first slat in the receiving track of a second slat, to form a loosely articulated hinge between the slats. In an open position, the rolling shutter curtain is retracted or raised away from the opening by coiling or winding the slats about a spindle positioned at the top of the opening. In the closed position, the slats are unwound from the spindle and extended or lowered toward the bottom of the opening. An example of a shutter slat is described in U.S. Pat. No. 9,074,411 to Miller et al., which is incorporated herein by reference.

Conventional rolling shutter slats are commonly designed to have engaging tracks and receiving tracks that fit closely to prevent intrusion into the hinge and to resist deflection of the extended rolling shutter curtain from external forces. However, the closely fitting design tends to accumulate debris, which becomes compacted over time and may interfere with the operation of the hinge. The narrow dimensional tolerances of the closely fitting design also increases the difficulty in manufacturing the rolling shutter slats.

To better accommodate the introduction of debris, it would be desirable to design the rolling shutter slats with loosely articulated hinges that have an increased clearance and range of rotation. A loosely articulated hinge design would also increase the allowable dimensional tolerances and improve the manufacturability of the slats. However, such designs also increase the risk of inadvertent decoupling of the slats in the rolling shutter. Thus, it would be desirable to provide a loosely articulated hinge design without the problem of decoupling.

Rolling shutters are also commonly designed to reduce the profile of the retracted rolling shutter, by configuring the slats to be tightly nested when coiled about the spindle. The tight nesting of the slats increases the contact between slats and the risk of wear and cosmetic blemishes to the finish of the slats. Thus, it would be desirable to protect against inadvertent contact and wear between the slats, while maintaining the ability to tightly coil the rolling shutter in the retracted position.

In some cases, it is useful to provide rolling shutters with additional functionality, such as a rolling shutter locking device, or reinforcement. Thus, it would be desirable for the rolling shutter to include a modular utility slat that can easily be modified to receive additional functionality. In addition, it would be advantageous if the utility slat can be configured to be located at different points in the rolling shutter, while maintaining tight nesting of the rolling shutter in the retracted position.

SUMMARY OF THE INVENTION

In one embodiment, a utility slat for a rolling shutter comprises a single-walled slat body and a cover. The slat body comprises a slat inner surface with a concave curvature, a slat outer surface with a convex curvature, and first and second edges. A U-shaped channel is formed in the slat body, and comprises a channel base and first and second channel walls that define an interior space. An opening into the interior space is defined between the first and second channel walls. The cover is removably coupled to the slat body to enclose the interior space.

In another embodiment, a rolling shutter comprises a spindle, and a plurality of linked slats. Each slat has a single-walled slat body with a slat inner surface with a concave curvature, a slat outer surface with a convex curvature, and first and second edges. An engaging track is positioned at the first edge, and a receiving track is positioned at the second edge. The receiving track is configured to receive the engaging track of another slat. The slats have a height defined by the distance between the engaging track and the receiving track. The plurality of linked slats includes at least one utility slat that further comprises a U-shaped channel formed in the slat body, and a cover. The U-shaped channel comprises a channel base, and first and second channel walls that define an interior space. An opening into the interior space is defined between the first and second channel walls. The cover is removably coupled to the slat body to enclose the interior space. The plurality of slats has a retracted position wherein the slats are wound about the spindle in a plurality of successive windings, including a utility slat winding that includes the utility slat. The utility slat winding comprises at least one slat having a first height and that is tightly nested with the slats of the previous winding, and the utility slat has a second height that is about the same as the first height.

In another embodiment, a utility slat for a rolling shutter comprises a single-walled slat body having a slat inner surface with a concave curvature, a slat outer surface with a convex curvature, and first and second edges. A U-shaped channel is formed in the slat body, that comprises a channel base and first and second channel walls that define an interior space. A channel opening into the interior space is defined between the first and second channel walls. A cover is removably coupled to the slat body to enclose the interior space, the cover having a cover outer surface. A spacer projects from the cover, above the cover outer surface. In a further embodiment, the cover has a cover opening into the interior space. A locking device is positioned in the interior space for securing the rolling shutter, the locking device having an exposed portion extending from the opening and projecting above the cover outer surface at a first height. The spacer projects above the cover outer surface at a second height that is greater than the first height.

In one embodiment, a rolling shutter system comprises a spindle and a plurality of coupled slats, including an initial slat coupled to the spindle and a base slat distal to the spindle. The plurality of slats have a retracted position and an extended position, where the slats are wound about the spindle in the retracted position. A retaining rail or guide track is configured to receive the slats in an extended position. In a further embodiment, the rolling shutter system further comprises an end retention device comprising: a retaining screw; a bushing positioned on the retaining screw; and a guide track configured to receive the retaining screw. At least one slat has a screw boss sized and shaped to receive the retaining screw, and the at least one slat is coupled to the guide track when the retaining screw is received in the guide track.

DETAILED DESCRIPTION OF THE INVENTION

Figure 1A:
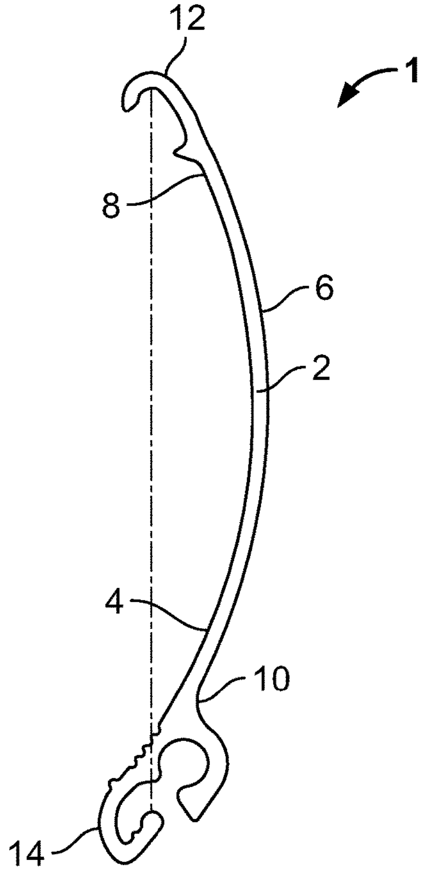
FIG. 1A is a side section view of an embodiment of a rolling shutter slat, in a vertical position.
Figure 1B:
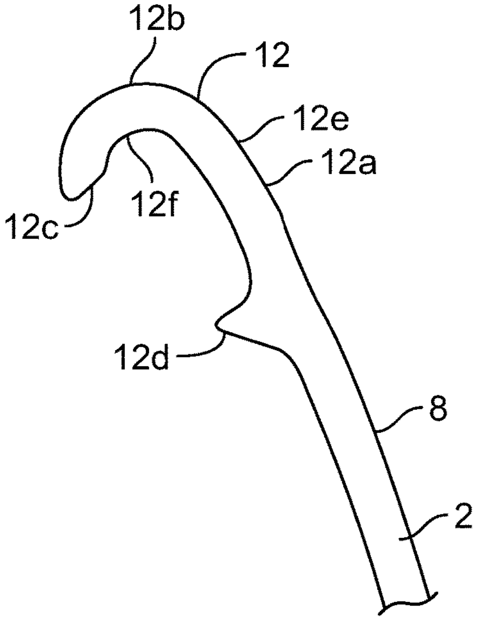
FIG. 1B is a detail, side section view of the engaging track of the slat of FIG. 1A.
Figure 1C:
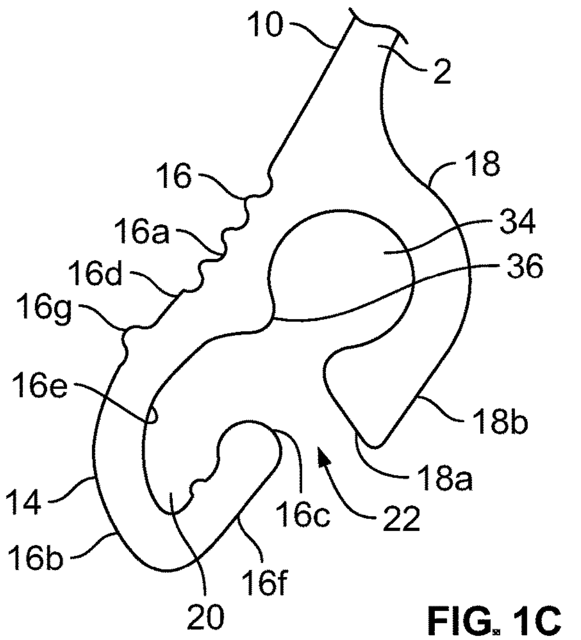
FIG. 1C is a detail, side section view of the receiving track of the slat of FIG. 1A.

Referring to FIGS. 1A-1C, an embodiment of a slat 1 for a rolling shutter is shown. Slat 1 comprises a single-walled body 2 having a curvature with an inner side or surface 4 with a concave curve, and an outer side or surface 6 with a convex curve. Body 2 has a top edge 8 and a bottom edge 10. A hook-shaped engaging track 12 is positioned at edge 8, and a receiving track 14 is positioned at edge 10. Receiving track 14 is configured to receive the engaging track 12 of another slat, such that multiple slats may be linked together in head-to-tail fashion and extended to form a curtain that covers an opening in a structure.

FIG. 1A shows slat 1 in a vertical orientation or position, such as when the rolling shutter is in a closed position and the slats are extended to cover an opening. The centers of mass of engaging track 12 and receiving track 14 are vertically aligned. As shown in FIG. 1B, hook-shaped engaging track 12 is positioned at edge 8, and comprises a neck or base 12*a* adjacent to edge 8, and a bend 12*b* that extends to a tip 12*c*. In one embodiment, base 12*a* extends along the same curvature as body 2, and bend 12*b* curves toward concave inner side 4 such that engaging track 12 does not project beyond the convex curve of outer side 6. In a preferred embodiment, engaging track base 12*a* has an outer surface 12*e* that extends along the same curve as convex outer surface 6 of body 2. In one embodiment, engaging track 12 includes a protrusion or rib 12*d* positioned at edge 8, that projects from concave inner side 4. Engaging track rib 12*d* limits the rotation of engaging track 12 in the receiving track 14 of another slat and prevents inadvertent disengagement of the slats, as described below.

As shown in FIG. 1C, receiving track 14 is positioned at edge 10, and comprises a lip member 16 and guard member 18. Lip member 16 comprises a base 16*a* adjacent to edge 10, and a bend 16*b* that extends to a tip 16*c*. Receiving track bend 16*b* forms a pocket or articulation space 20 that is sized and shaped to receive the hook-shaped engaging track 12 of another slat. In one embodiment, base 16*a* extends along the same curvature as body 2, and bend 16*b* curves toward convex outer side 4 such that receiving track 14 does not project beyond the concave curve of inner side 6. In a preferred embodiment, lip member base 16*a* has an outer surface 16*d* that extends along the same curve as concave inner surface 4 of body 2. In one embodiment, lip member outer surface 16*d* includes a bump or protrusion 16*g* that reduces wear on the slats when the rolling shutter is in the retracted position, as described below.

Guard member 18 is spaced apart from lip member 16, and has a tip 18*a* that extends toward lip member tip 16*c*. Guard member tip 18*a* and lip member tip 16*c* are spaced apart to form an aperture 22, that opens to articulation space 20 and is sized and shaped to receive the hook-shaped engaging track 12 of another slat. Guard member 18 projects above the convex curve of slat outer side 4, and includes an outer surface 18*b* that is approximately concentric with the convex curve of outer side 4.

In one embodiment, receiving track 14 includes a receptacle 34 formed between guard member 16 and lip member 18. Receptacle 34 is separate from articulation space 20, and is sized and shaped to receive an end retention device, as described below. In a preferred embodiment, a rib 36 is formed on the inner surface 16*e* of lip member 16, that separates articulation space 20 and receptacle 34.

Figure 2A:
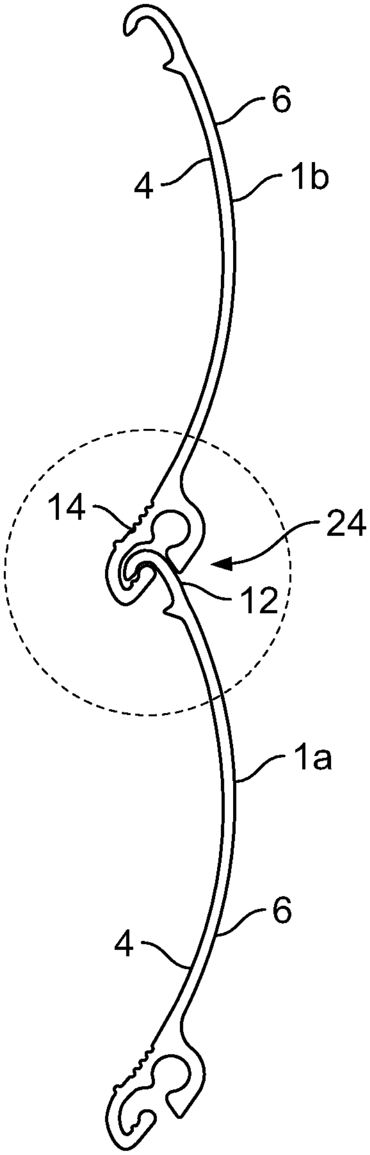
FIG. 2A is a side section view of two linked slats of FIG. 1A.
Figure 2B:
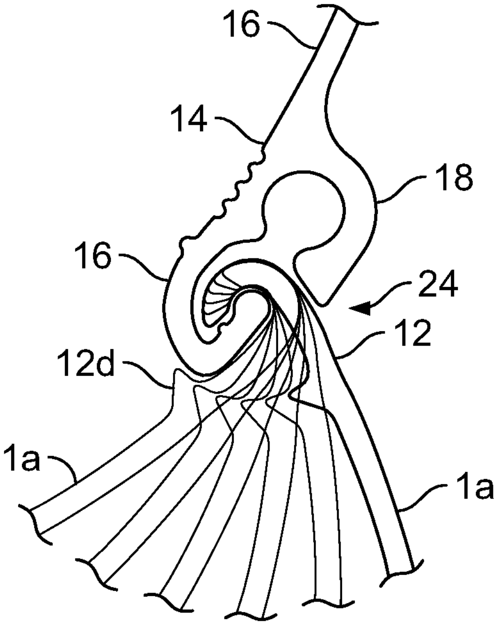
FIG. 2B is a detail, side section view of the hinge between the slats of FIG. 2A, showing the range of rotation.
Figure 2C:
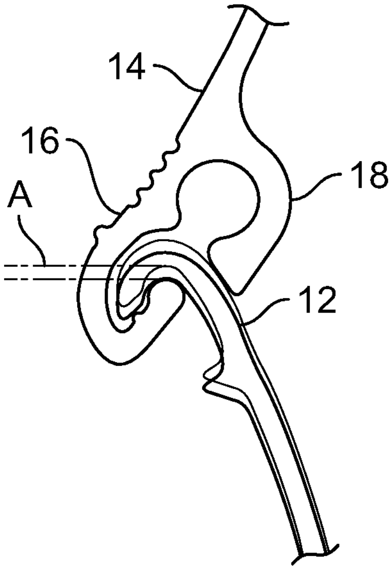
FIG. 2C is a detail, side section view of the hinge between the slats of FIG. 2A, showing the vertical clearance.

FIGS. 2A-2C show an embodiment of two slats 1*a* and 1*b* that are linked together in a vertical position, with the maximum extension of the two linked slats. Engaging track 12 of slat 1*a* is received in the receiving track 14 of slat 1*b* to form an articulating hinge 24 between the two slats. During articulation of hinge 24, bend inner surface 12*f* of engaging track 12 bears on lip member tip 16*c* of receiving track 14. In one embodiment, inner surface 12*f* and tip 16*c* are configured with complementary rounded surfaces that facilitate articulation of hinge 24 and rotation of slats 1*a* and 1*b*, to increase the ease of operation and product life of the slats.

As shown in FIGS. 2B and 2C, hinge 24 is designed to provide engaging track 12 with an increased range of rotation and vertical clearance "A" within receiving track 14 in comparison to conventional rolling shutter slats. The increased range of rotation and vertical clearance accommodates the introduction of debris into articulation space 20, reduces the compression and buildup of debris, and facilitates the self-cleaning of debris from the articulation space. The increased range of rotation and vertical clearance also increases the allowable dimensional tolerances of manufacturing, and improves manufacturability of the slats.

Figure 3A:
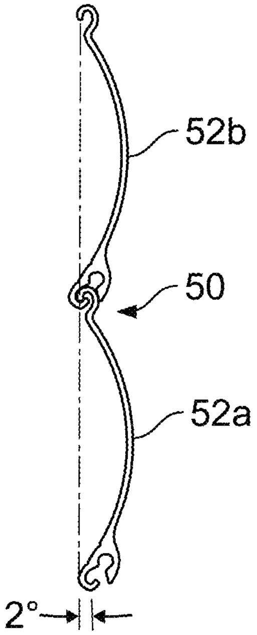
FIG. 3A (Prior Art)
FIG. 3A is a side section view of two prior art linked slats.
Figure 3B:
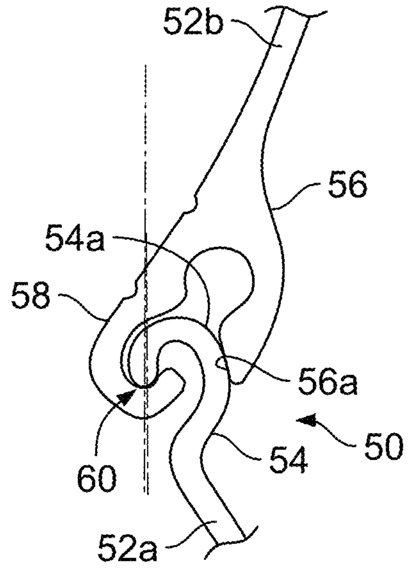
FIG. 3B (Prior Art)
FIG. 3B is a detail side section view of the linked slats of FIG. 3A.
Figure 3C:
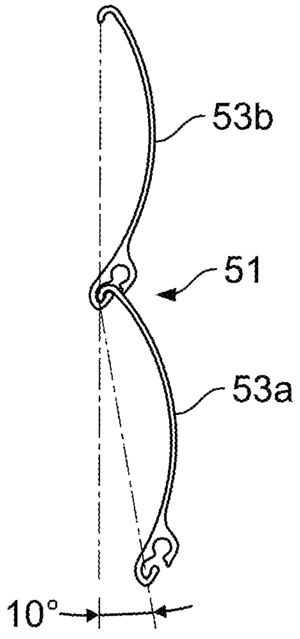
FIG. 3C (Prior Art)
FIG. 3C is a side section view view of another embodiment of two prior art linked slats.
Figure 3D:
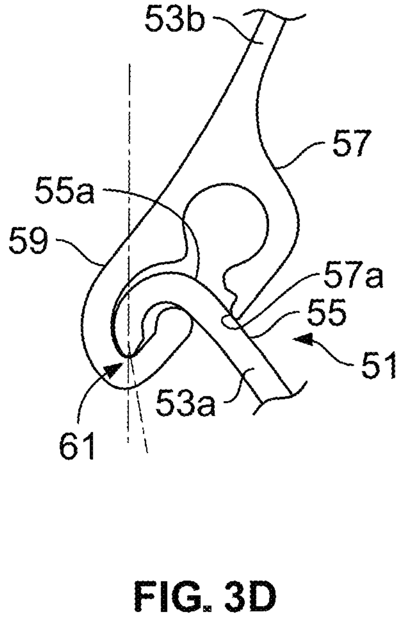
FIG. 3D (Prior Art)
FIG. 3D is a detail side section view of the linked slats of FIG. 3C.

Conventional rolling shutters are typically designed to resist deflection from exterior forces when in the closed (vertical) position, by restricting the backward rotation of the hinge between slats and limiting the clearance of the engaging track within the hinge. As used herein, backward or back rotation means the rotation of two linked slats such that the (convex) outer side 6 of the first slat rotates toward the (convex) outer side 6 of the second slat—e.g., the counterclockwise rotation of slat 1*a* relative to slat 1*b* as shown in FIG. 2A. Examples of prior art rolling shutters are disclosed in U.S. Pat. No. 8,944,137 to Miller (FIGS. 3A and 3B), and U.S. Pat. No. 9,074,411 to Miller et al. (FIGS. 3C and 3D), which are incorporated herein by reference. FIGS. 3A and 3B show prior art linked slats 52*a* and 52*b* that have a hinge 50 designed to have a maximum back rotation of only about 2° from vertical (i.e. counterclockwise rotation of slat 52*a* relative to slat 52*b*). Receiving track guard member tip 56*a* angles sharply toward lip member 58 and is configured to generally conform to the outer surface 54*a* of guard member 54, to limit rotation of slat 52*a* and restrict the back rotation of hinge 50. FIGS. 3C and 3D show prior art linked slats 51*a* and 51*b* that have a hinge 50 designed to limit back rotation to only about 10° from vertical. Receiving track guard member tip 57*a* similarly angles sharply toward lip member 59 to contact the outer surface 55*a* of guard member 55, limit rotation of slat 53*a*, and restrict the back rotation of the hinge 51.

Guard members 56 and 57 are also configured to respectively restrict the vertical movement of engaging tracks 54 and 55, which may contribute to the compression of debris or other material within hinges 50 and 51. In the vertical position, hinges 50 and 51 have minimal vertical clearance. Furthermore, engaging tracks 54 and 55 respectively pivot on inner surfaces 60 and 61 of receiving track lip members 58 and 59. This configuration may cause debris introduced into hinges 50 and 51 to be scraped and compacted at the bottom of the receiving track inner surfaces 60 and 61. Over time, the buildup of debris may impair the rotation of the slats and function of the hinge.

Figure 4A:
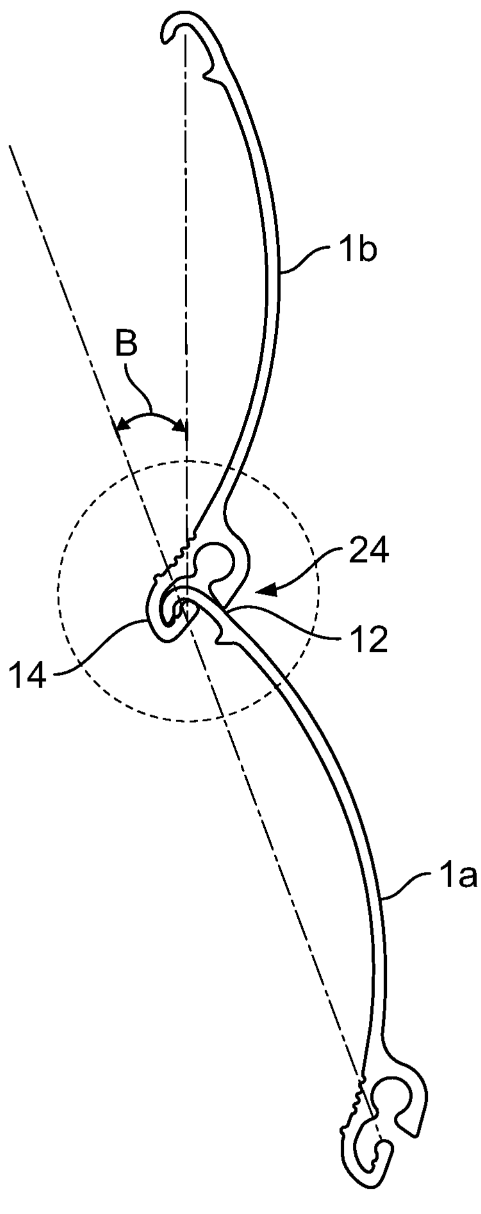
FIG. 4A is a side section view of two linked slats of FIG. 1A, showing the back rotation of the slats.
Figure 4B:
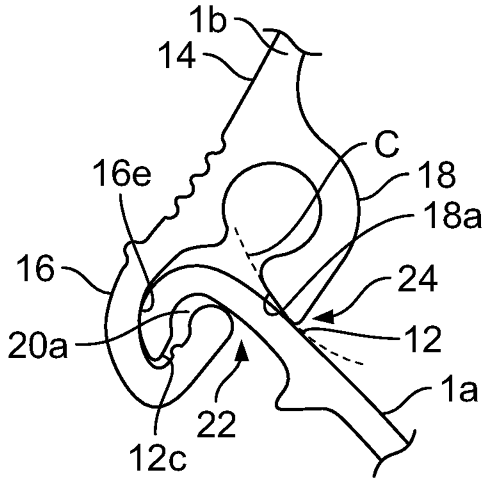
FIG. 4B is a detail, side section view of the hinge between the slats of FIG. 4A.

In one embodiment, the inventive slats are configured to allow back rotation of the hinge substantially beyond vertical. FIGS. 4A and 4B show the back rotation of hinge 24 between linked slats 1*a* and 1*b*. Guard member tip 18*a* has a rounder profile with a convex surface in comparison to the generally concave profile of conventional guard member tips 56*a* and 57*a*, such that aperture 22 allows a greater range of rotation of engaging track 12 in the aperture. In a preferred embodiment, the surface of guard member tip 18*a* has a convex curve "C" with a radius of about 0.25 inches. In contrast to the prior art, slat 1*a* may rotate backward substantially past vertical before guard member tip 18*a* contacts engaging track 12. In one embodiment, guard member 18 is configured such that hinge 24 has a maximum angle of back rotation "B" that is greater than 10°, and preferably at least about 15°. In one embodiment, hinge 24 has a maximum angle of back rotation that is about 18° from vertical (complementary angle between convex outer surfaces 6 of about 162°).

The rounder profile of guard member tip 18*a* also contributes to increased vertical clearance of hinge 24. In one embodiment, when hinge 24 is in the vertical position with linked slats 1*a* and 1*b* in the vertical orientation, engaging track 12 is vertically displaceable within aperture 22 of receiving track 14 by a height "A" (FIG. 2C). Hinge 24 has a vertical clearance "A" of at least about 0.025 inches, and more preferably about 0.0287 inches.

The back rotation and vertical clearance of hinge 24 allow the hinge to accommodate the introduction of debris, and contributes to self-cleaning of debris from the hinge. As engaging track 12 rotates to the vertical position in receiving track articulation space 20, engaging track tip 12*c* scrapes the inner surface 16*e* of the articulation space. As best shown in FIG. 4B, the back rotation of engaging track 12 past vertical, creates an interior space 20*a* within engaging track bend inner surface 12*f*, between engaging track tip 12*c* and receiving track tip 16*c*. Debris introduced into hinge 24 is not compressed, but is pushed into space 20*a*. The vertical clearance of hinge 24 (vertical displacement of engaging track 12) allows the collected debris to be ejected from space 20*a* and escape from the hinge.

Figure 4C:
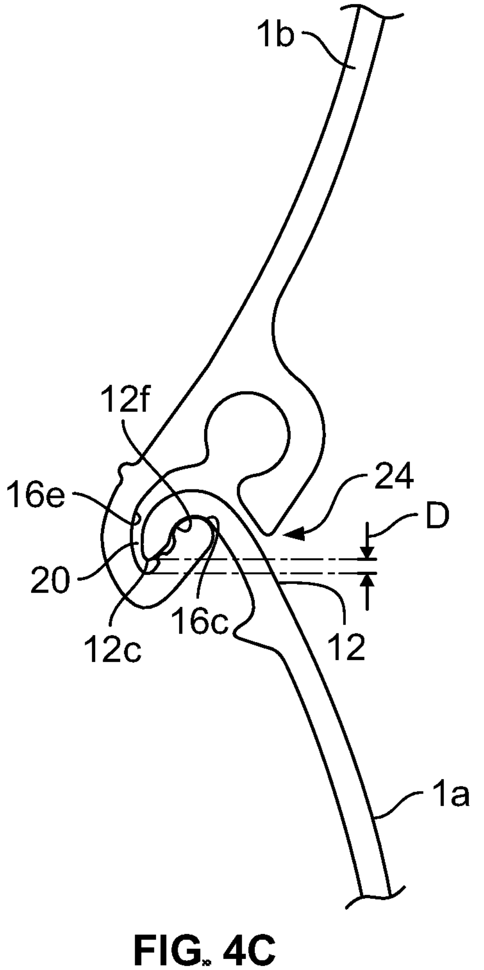
FIG. 4C is a detail, side section view of the hinge between the slats of FIG. 4A in the vertical position, showing the vertical clearance at the tip of the engaging hook and the receiving track.

Compression of debris may also be reduced by configuring hinge 24 such that the engaging track does not pivot on the inner wall of the receiving track. FIG. 4C shows an embodiment of hinge 24 in the vertical position. Engaging track bend inner surface 12*f* pivots on receiving track tip 16*c*. Engaging track tip 12*c* is separated from the bottom of receiving track inner surface 16*e* by a vertical clearance "D". The separation reduces the likelihood that debris will become trapped and compacted within receiving track articulation space 20. In one embodiment, hinge 24 has a vertical clearance "D" of at least about 0.025 inches, preferably between about 0.025 to about 0.03 inches, and more preferably about 0.0265 inches.

Figure 5A:
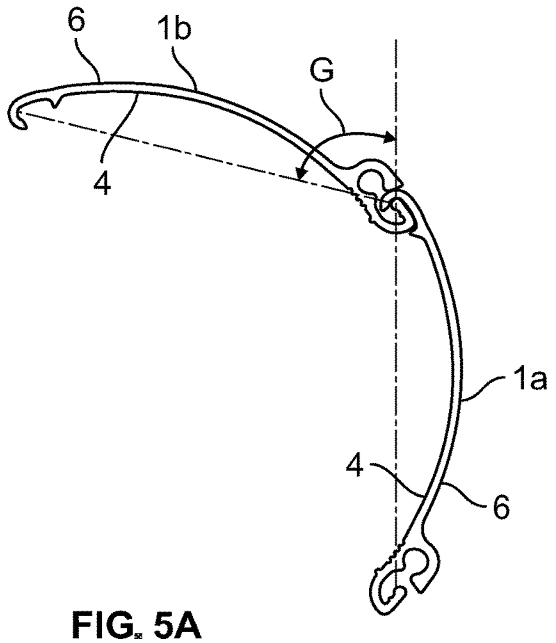
FIG. 5A is a side section view of two linked slats of FIG. 1A, showing the forward rotation of the slats.
Figure 5B:
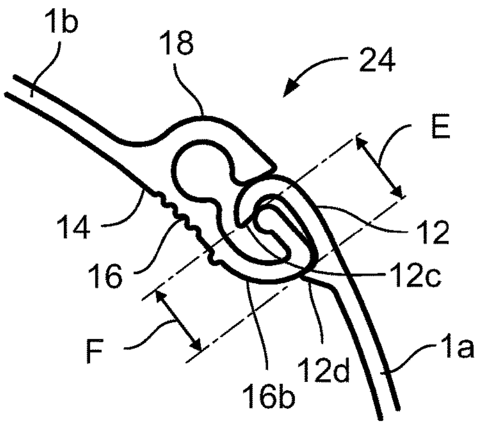
FIG. 5B is a detail, side section view of the hinge between the slats of FIG. 5A.

In some configurations, the rounder profile of guard member tip 18*a* and the increased vertical clearance of hinge 24 may permit the overrotation and inadvertent disengagement or decoupling of the slats. In one embodiment, hinge 24 is configured to prevent overrotation and decoupling of the linked slats. FIGS. 5A and 5B show an embodiment of linked slats 1*a* and 1*b* with an engaging track rib 12*d* spaced apart from engaging track tip 12*c*, that limits the forward rotation of hinge 24. As used herein, forward rotation means the rotation of two linked slats such that the (concave) inner side 4 of the first slat rotates toward the (concave) inner side 4 of the second slat—e.g., the clockwise rotation of slat 1*a* relative to slat 1*b* as shown in FIG. 2A. A portion of receiving track 14 comprising lip member segment 16*f* between tip 16*c* and bend 16*b*, is captured in engaging track 12 between engaging track tip 12*c* and rib 12*d*. The maximum height "E" of lip member segment 16*f* between tip 16*c* and bend 16*b*, is greater than the maximum height "F" between engaging track tip 12*c* and rib 12*d*. As slat 1*a* rotates forward, engaging track rib 12*d* of slat 1*a* contacts receiving track lip member 16 (preferably bend 16*b*) of slat 1*b* to stop the forward rotation of the slat 1*a*.

In general, overrotation is desirable to increase the allowable dimensional tolerances of manufacturing and improve manufacturability of the rolling shutter slats. Preferably, height "E" is only slightly or marginally greater than height "F", to increase the degree of articulation (overrotation) while preventing decoupling. In one embodiment, slats 1*a* and 1*b* form a hinge 24 with a maximum angle of forward rotation "G" (FIG. 5A) of between about 70° to about 80° from vertical, and preferably about 76° from vertical (i.e. complementary angle of 104° between concave inner surfaces 4). In another embodiment, the maximum height "E" of lip member segment 16*f* between tip 16*c* and bend 16*b* is about 0.219 inches, and the maximum height "F" between engaging track tip 12*c* and rib 12*d* is about 0.216 inches.

The use of engaging track rib 12*d* to prevent overrotation provides advantages over conventional slat designs, including consistency in the design of hinge 24. As described below, rolling shutters commonly comprise slats with different heights (i.e. the maximum vertical height of slat 1 between engaging track 12 and receiving track 14) and radii of curvature. In conventional rolling shutter slat designs without an engaging track rib 12*d*, the geometries of the engaging track and/or receiving track are configured to prevent overrotation and decoupling of the hinge. These geometries are not uniform across all slats, but must be modified to reflect the different heights and radii of curvature of the slats. In contrast to conventional slat designs, overrotation is restricted by engaging track rib 12*d*, which allows slats with different heights and radii of curvature to be configured with engaging tracks 12 and receiving tracks 14 that have consistent geometries, and allows hinges 24 to be formed even between slats 1*a* and 1*b* that have substantially different heights and radii of curvature. Engaging track rib 12*d* similarly facilitates the use of accessory slats that may only be available in a single configuration, such as finger pull slats and utility slats described below. In addition, the restriction of overrotation by engaging track rib 12*d* reduces the dependence on guard member 18 to prevent decoupling of hinge 24, which permits reduction of the guard member to provide greater vertical clearance within the hinge.

A rolling shutter curtain is formed of a series of slats 1 that are linked in head-to-tail fashion to form a chain, with the engaging track 12 of a successive slat engaged in the receiving track 14 of the preceding slat in the chain. In the closed position, the slats 1 are extended (vertically) to cover the opening of a host structure. In the open position, the slats 1 are retracted (raised) from the opening by coiling or winding the linked slats about a spindle. The retracted rolling shutter typically comprises multiple windings of slats 1 that substantially encircle the spindle. The windings of slats are preferably tightly nested to minimize the space required by the retracted rolling shutter.

Figure 6A:
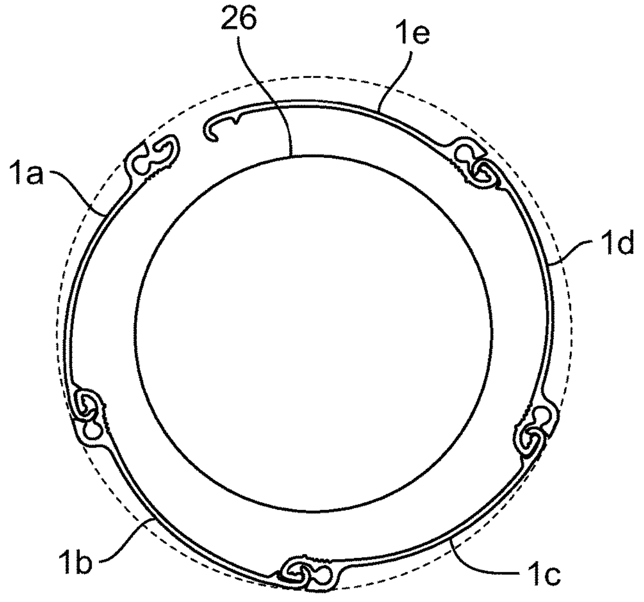
FIG. 6A is a side section view of a series of linked slats of FIG. 1A, that form single a winding of slats about a spindle.

FIG. 6A shows an embodiment of a single winding, comprising five slats 1*a*-1*e* wound about a spindle 26. Adjacent slats in the winding (e.g., 1*a* and 1*b*) have a standard forward rotation angle of about 69° from vertical. In one embodiment, each winding comprises the same number of slats, which permits the alignment of slats in successive windings to facilitate tight nesting.

Figure 6B:
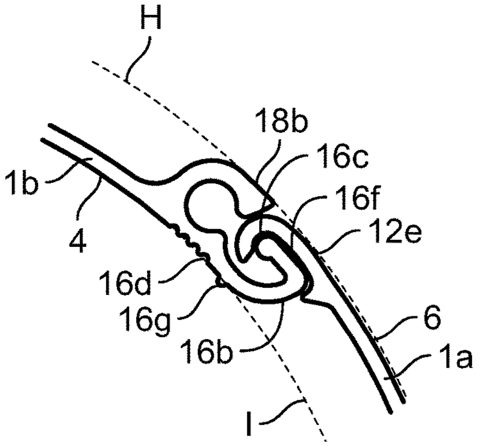
FIG. 6B is a detail, side section view of the hinge between two linked slats of FIG. 6A, showing the alignment of the slat surfaces.

Tight nesting may be further improved by configuring the slats to form windings with concentric surfaces. In the embodiment of FIGS. 6A and 6B, the slats form a winding with concentric outer and inner surfaces "H" and "I". Guard member outer surface 18*b* of slat 1*b* and engaging track base outer surface 12*e* of slat 1*a* are aligned and extend along the same curve as convex body outer surface 6 of slat 1*a*, to form a combined winding outer surface "H". Similarly, lip member base outer surface 16*d* of slat 1*b* extends along the same curve as body concave inner surface 4 of slat 1*b*, to form a combined winding inner surface "I". In a preferred embodiment, the curves of winding outer and inner surfaces H and I are approximately concentric (i.e. share a center point located on the longitudinal axis of spindle 26) to improve tight nesting of adjacent windings when the rolling shutter is in the retracted position. In one embodiment, lip member segment 16*f* has an outer surface that is also concentric with inner and outer surfaces D and E, to facilitate the alignment of engaging track base outer surface 12*e* with guard member outer surface 18*b*.

The tightly nested configuration of the retracted rolling shutter increases the risk of wear caused by contact between the slats of adjacent windings. In one embodiment, a wear rib or bump 16*g* is positioned on the inner surface of slat 1 (i.e surfaces 4 and 16*d*), to reduce contact between the slats in the retracted position. Wear bump 16*g* is preferably located at a position that has a high probability of contact with a slat of the adjacent (previous) winding, such as the region of hinge 24. In one embodiment, wear bump 16*g* is positioned on lip member outer surface 16*d*. Wear bump 16*g* creates separation between the slats of adjacent windings, by reducing the face-to-face contact between slats to the minimal area of the wear bump, which reduces inadvertent damage to the surface finish of the slats and increases product life.

Figure 6C:
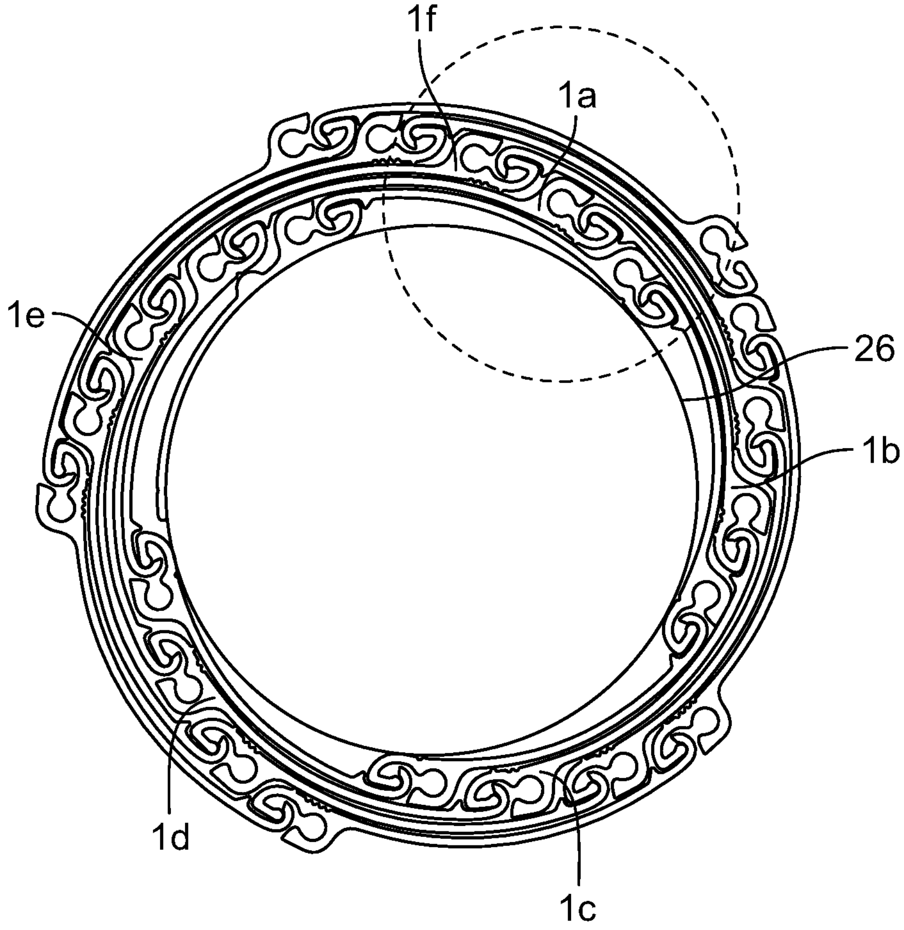
FIG. 6C is a side section view of a rolling shutter comprising a series of linked slats of FIG. 1A, that form multiple tightly nested windings of slats about a spindle.
Figure 6D:
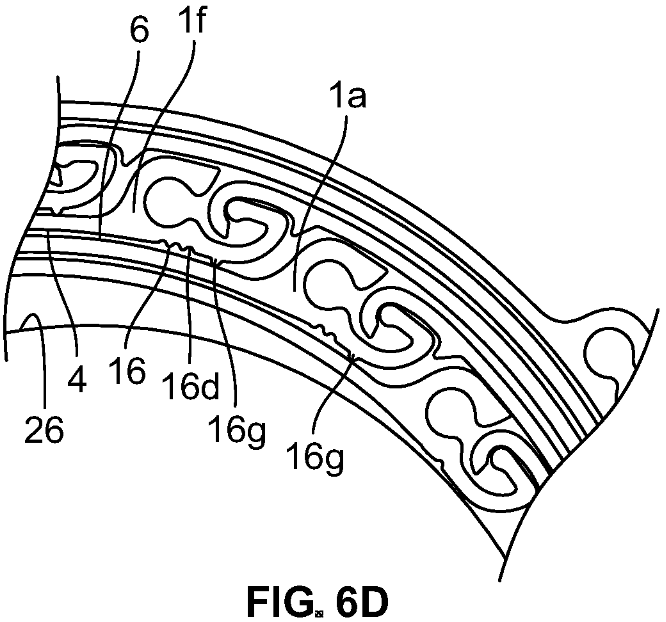
FIG. 6D is a detail, side section view of the rolling shutter of FIG. 6C.

FIGS. 6C and 6D show a rolling shutter in the retracted position, wound or coiled about spindle 26 in a tightly nested configuration. The rolling shutter coil includes a winding comprising five slats 1*a*-1*e*, with slat 1*a* overlapped by slat if in the successive winding. A wear bump 16*g* is positioned on lip member 16 at outer surface 16*d* of each slat, to separate the adjacent (overlapping) slats of successive windings. As shown in FIG. 6D, wear bump 16*g* of slat 1*e* reduces the face-to-face contact between the adjacent winding inner and outer surfaces in the coil—e.g., between slat if body inner surface 4 and lip member surface 16*d* (inner surface "I"), and slat 1*e* body outer surface 6 (outer surface "H").

Wear bump 16*g* also increases the allowable dimensional tolerances of manufacturing and improves manufacturability of the rolling shutter slats. For example, the separation between slats created by wear bump 16*g* accommodates variations in the concentricity of adjacent windings. Conversely, the concentricity of the slats can be adjusted by simply changing the size of wear bump 16, rather than redesigning the slat dimensions and curvature.

Those of skill in the art will appreciate that the circumference of each successive winding of slats will increase the further from the spindle. Therefore, the height of the slats must increase in each successive winding to accommodate the increasing circumference and maintain the same number of slats in each winding—i.e. the maximum vertical height of slat 1 between engaging track 12 and receiving track 14 generally increases the further from the spindle. The radius of curvature of the slats also must increase in each successive winding to maintain the concentricity of the windings. In a one embodiment, the height and radius of curvature of the slats in a rolling shutter curtain increases monotonically the further from the spindle.

Figure 8B:
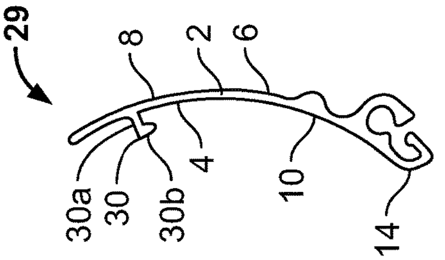
FIG. 8B is a side section view of an alternative embodiment of a starter slat for a rolling shutter.
Figure 8A:
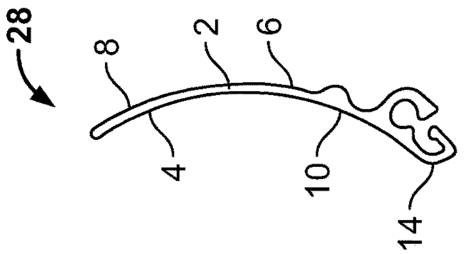
FIG. 8A is a side section view of an embodiment of a starter slat for a rolling shutter.
Figure 9:
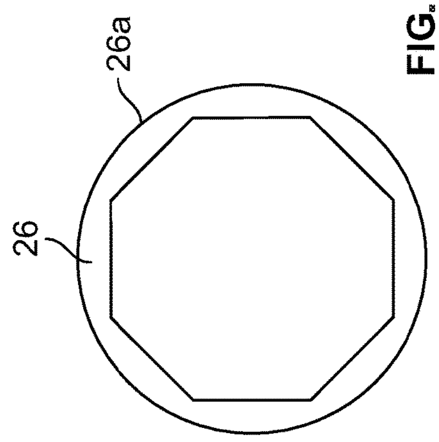
FIG. 9 is a side section view of an embodiment of a spindle for a rolling shutter.

An initial starter slat of the rolling shutter curtain is coupled to the spindle. FIGS. 8A and 9 shown an embodiment of a spindle 26 and a corresponding starter slat 28. Spindle 26 is generally cylindrical, with an outer surface 26*a*. Starter slat 28 is a partial slat with a similar configuration to slat 1, comprising a body 2 having a curvature with a concave inner surface 4 and a convex outer surface 6. Starter slat 28 has a top and bottom edges 8 and 9, with a receiving track 14 positioned at bottom edge 10. However, starter slat 28 does not include an engaging track at top edge 8. The curvature of starter slat body 2 (and preferably the curve of concave inner surface 4) conforms to the curvature of spindle outer surface 26*a*. Starter slat 28 may be coupled to spindle 26 using various fasteners as are known in the art. For example, starter slat 28 may be attached to spindle 26 using screws.

Figure 10:
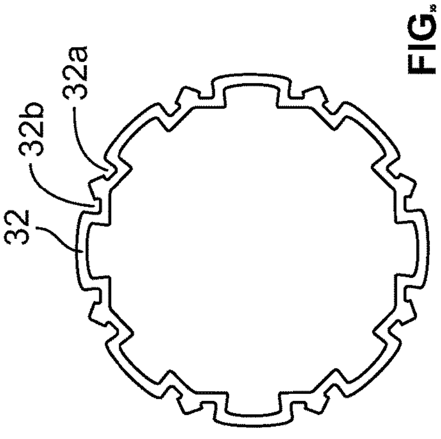
FIG. 10 is a side section view of an alternative embodiment of a spindle for a rolling shutter.

The starter slat and spindle may also be configured to be coupled without a fastener. FIGS. 8*b* and 10 show an embodiment of a spindle 32 and complementary starter slat 29. Starter slat inner surface 4 has a flange 30 positioned at edge 8, and spindle 32 has one or more complementary channels 32*a* that are sized and shaped to receive flange 30. In a preferred embodiment, flange 30 is generally L-shaped, having a stem 30*a* and leg 30*b*. Channel 32*a* is sized and shaped for hook-in or snap-fit insertion of L-shaped flange 30 into the channel to couple starter slat 29 to spindle 32. In one embodiment, spindle 32 may include one or more channels 32*b* that are a mirror image of channel 32*a*, to allow starter slat 28 to be coupled to the spindle in the opposite orientation to coupling to channel 32*a*. Starter slat 29 is coupled to spindle 32 with receiving track 14 extending around the spindle in the counterclockwise direction when flange 30 is received in channel 32*a*, and extending in the clockwise direction when flange 30 is received in channel 32*b*.

Figure 7B:
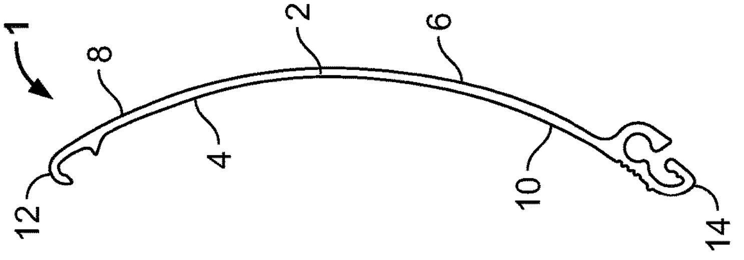
FIG. 7B is a side section view of an embodiment of a slat, dimensioned to be incorporated in a winding distal to the spindle.
Figure 7A:
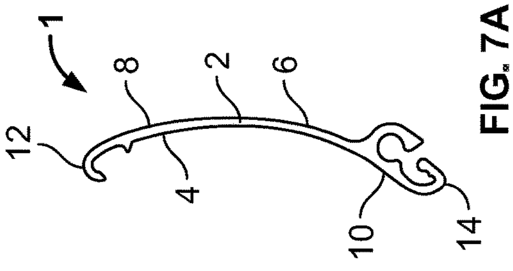
FIG. 7A is a side section view of an embodiment of a rolling shutter slat, dimensioned to be incorporated in a winding proximal to the spindle.

In a preferred embodiment, the rolling shutter has a spindle 26 with an outer diameter of about 3.325 inches, and comprises a series slats having monotonically increasing heights (i.e. maximum height between engaging track 12 and receiving track 14) selected from the progression: 2.3118, 2.4618, 2.6180, 2.7787, 2.9446, 3.1170, 3.2699, 3.4265, 3.5877, 3.7543, 3.9275, and 4.0971 inches. Sequential slats in the series have a maximum difference in slat height of about 6% (i.e. between sequential slat heights of 2.3118 and 2.4618 inches). The difference between non-sequential slat heights ranges from a minimum of about 8.5% (3.7543 to 4.0971 inches) to a maximum of about 43.5% (2.3118 to 4.0971 inches). FIGS. 7A and 7B show a comparison of a slat in an initial winding proximal to the spindle having a height of about 2.3118 inches, and a slat in a terminal winding distal to the spindle having a height of about 4.0971 inches. In an alternative embodiment, the rolling shutter has a spindle 32 comprising a snap-in drive tube (e.g., FIG. 5) with an outer diameter of about 3.315 inches.

As discussed above, rib 12*d* enables the formation of hinges 24 between slats having substantially different heights and radii of curvature. In the aforementioned embodiment of a progression of slat heights, hinge 24 may be formed between non-sequential slats having a difference in slat height of at least about 7%. In another embodiment, hinge 24 is formed between non-sequential slats having a difference in slat height ranging between about 9% to about 45%.

To accommodate different spindle diameters, the quantity of identical slats present in the initial layer (winding) of slats can be altered from the standard value. In this arrangement, a certain quantity of slats equal to or less than a standard value can be used before progressing through the standard slat groups to achieve a nested configuration. Further, any subset of the standard slat groups can be used. In one embodiment, this alternate slat configuration may be used in the manufacture of shutters that exceed the mechanical limits of the standard spindles.

To optimize the slat profile sequence for a standard enclosure size, a subset of the curtain may be designed to utilize a nested configuration before transitioning to a standard non-nested configuration. This subset of nested curtain groups can be adjusted to be optimized for geometry, cost, manufacturability, or shutter strength in the field. In particular, the slat configuration can be optimized for different security levels at different points in the curtain.

Figure 11:
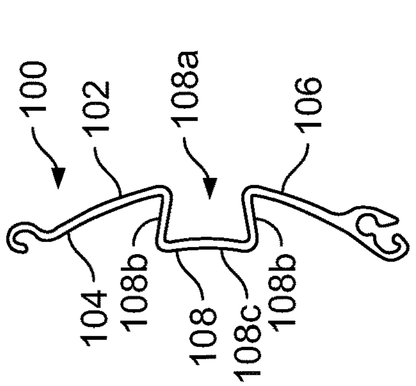
FIG. 11 is an accessory slat for a rolling shutter, comprising an embodiment of a finger pull.

The rolling shutter system may also comprise one or more accessory slats, such as a finger pull slat, coupler, base slat, and/or utility slat that are incorporated in the series of slats 1. Referring to FIGS. 11-19, embodiments of the slats, accessory slats and slat couplers of a rolling shutter system are shown. In one embodiment, the rolling shutter system includes a finger pull slat to facilitate manual operation of the rolling shutter. An example of a finger pull slat 100 is shown in FIG. 11, that has a similar configuration to slat 1, including a single-walled body 102 having a curvature with an inner side or surface 104 having a concave curve, and an outer side or surface 106 with a convex curve. Slat 100 further comprises a projection 108 formed in body 102 that provides a handle for manually raising or lowering the rolling shutter. In one embodiment, projection 108 is formed as a generally U-shaped channel in body 102 that has an opening 108*a* on outer side 106, and that projects from inner side 104 to create a handle surface 108*b*. In a preferred embodiment, the base 108*c* of the U-shaped channel has a curvature that is concentric with the curvature of body 102, to facilitate tight winding of the rolling shutter in the retracted position. An operator may either grasp handle 108*b* from the inside of the rolling shutter, or insert their fingers into opening 108*a* from outside the rolling shutter. Those of skill in the art will appreciate that projection 108 may be formed with the reverse configuration—i.e. with an opening on inner side 104 and a handle projecting from outer side 106.

Figure 13:
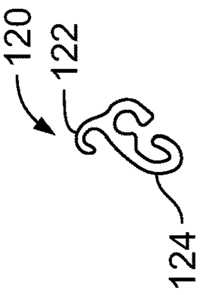
FIG. 13 is a side section view of an accessory slat for a rolling shutter, comprising an embodiment of a slat coupler.

In one embodiment, the rolling shutter system includes a coupler slat for adapting a rolling shutter to incorporate multiple different slat designs. Rolling shutter slats may be designed to emphasize different features which are reflected in the configuration and geometries of the engaging tracks and receiving tracks, such as tight nesting of the coiled shutter, or hinges with improved water resistance. FIG. 13 shows an embodiment of a coupler 12 for linking two slats having different designs. Coupler 120 comprises an engaging track 122 configured for a first slat design, and a receiving track 124 configured for a second slat design. In a preferred embodiment, coupler 120 does not include a body separating engaging track 122 and receiving track 124, to minimize the profile of the coupler in the rolling shutter and the separation between the two different slats.

In one embodiment, the rolling shutter system may include a base slat that is positioned at the end of the series of linked slats to contact the bottom of the opening in a host structure, when the rolling shutter is in the closed position. The base slat may include a seal and/or may be shaped to conform to the bottom of the opening to prevent gaps that would allow infiltration or the insertion of a pry tool. The base slat may also include a locking device for securing the rolling shutter in the closed position and prevent it from being raised from the bottom of the opening.

Figure 14:
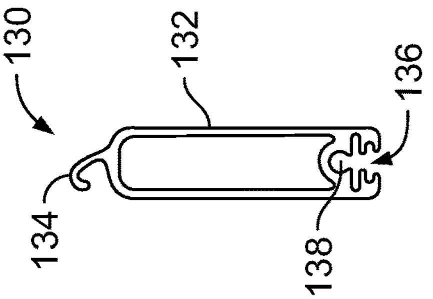
FIG. 14 is a side section view of an accessory slat for a rolling shutter, comprising an embodiment of a base slat.
Figure 15:
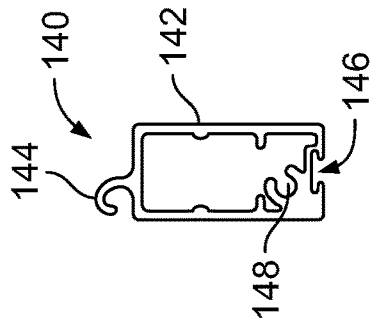
FIG. 15 is a side section view of an accessory slat for a rolling shutter, comprising an alternative embodiment of a base slat.

FIGS. 14-18 show base slats configured for a variety of different applications. FIGS. 14, 15 show embodiments of a large base slat 130 and small base slat 140. Large base slat 130 is generally configured for use in rolling shutter applications for building structures such as a doorway or window. Small base slat 140 is generally configured for use in smaller structures and furnishings, such as security cabinets, counters, and display cases. Base slats 130, 140 have double-walled bodies 132, 142 with an engaging track 134, 144 at a top end, and a channel 136, 146 formed at the bottom end. Channel 136, 146 are configured to receive a gasket or seal to allow the bottom end of base slats 130, 140 to better conform to the bottom of the opening of the host structure. In one embodiment, base slats 130, 140 may include a receptacle 138, 148 that may serve as a screw boss for an end retention device (as described below), or may be configured to receive a simple end plug or bushing (not shown) as are known in the art.

Figure 16:
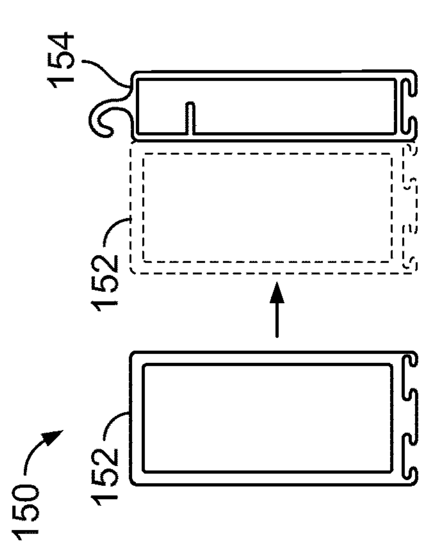
FIG. 16 is a side section view of an accessory slat for a rolling shutter, comprising an embodiment of a housing for a base slat.

FIG. 16 shows a housing 152 which is coupled to a base slat 154, to provide additional strength and stiffness. Housing 152 has a generally rectangular cross-section that is sized and shaped to conform to base slat 154, which may have a standard configuration such as base slat 130 (FIG. 14). Housing may be coupled to base slat 154 by one or more fasteners as are known in the art, such as screws or bolts.

Figure 17:
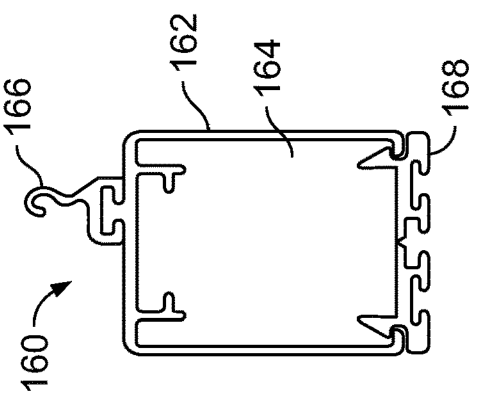
FIG. 17 is a side section view of an accessory slat for a rolling shutter, comprising an alternative embodiment of a base slat.

FIG. 17 shows a base slat 160 having a body 162 with an internal space 164 that is configured to receive additional functionality, such as a rolling shutter locking device (not shown). Base slat 160 has a top end with a removable coupler 166 that comprises an engaging track, and a removable bottom 168. Coupler 166 may be provided with different engaging track configurations to allow base slat 160 to be adapted for use with different rolling shutter designs. Bottom 168 is removable to provide convenient access to internal space 164 for installation of a locking device or other feature.

Figure 18:
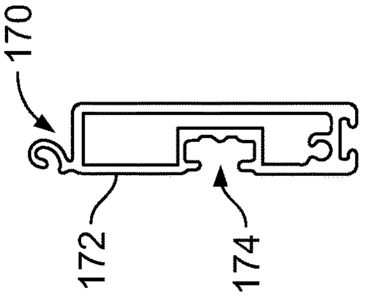
FIG. 18 is a side section view of an accessory slat for a rolling shutter, comprising an alternative embodiment of a base slat.

FIG. 18 shows a base slat 170 that has a body 172, with a channel 174 that is configured to receive a removable handle (not shown) to facilitate manual raising or lowering of the rolling shutter. In one embodiment, channel 174 is C-shaped and configured for snap-fit insertion of a handle.

Figure 19:
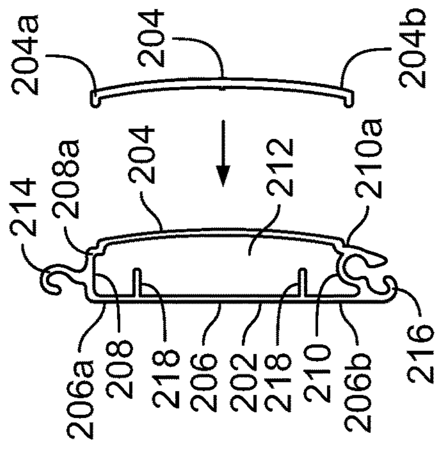
FIG. 19 is a side section view of an accessory slat for a rolling shutter, comprising an embodiment of a lock slat and cover.

In one embodiment, the rolling shutter system may include a utility slat with an interior space that can be modified to add functionality to the rolling shutter, such as a locking system or a reinforcing bar for the rolling shutter. An example of a utility slat 200 is shown in FIG. 19, that comprises a body 202 and a cover 204. Utility slat body 202 forms a generally U-shaped channel that comprises a base 206, and walls 208 and 210 that define an interior space 212. The ends 208*a* and 210*a* of walls 208 and 210 define the opening into interior space 212. Cover 204 is secured to body 202 to cover the opening and enclose interior space 212.

In one embodiment, cover 204 has edges 204*a* and 204*b*, with a height between edges 204*a* and 204*b* that is sufficient to cover the opening between ends 208*a* and 210*a*. Ends 208*a* and 210*a* are configured to respectively receive edges 204*a* and 204*b* and secure cover 204 to body 202. In one embodiment, cover 204 is removably secured to body 202. In a preferred embodiment, edges 204*a* and 204*b* are secured to ends 208*a* and 210*a* by snap fit insertion.

Utility slat 200 is preferably designed to be seamlessly incorporated in the rolling shutter at various positions in the sequence of slats. Utility slat 200 has an engaging track 214 and a receiving track 216 that are similar to or otherwise compatible with engaging track 12 and receiving track 14 of slat 1. In one embodiment, an engaging track 214 and a receiving track 216 are positioned at opposite ends 206*a* and 206*b* of base 206. In a preferred embodiment, engaging track 214 and receiving track 216 are respectively positioned on walls 208 and 210, and may form at least part of walls 208 and/or 210. In one embodiment, utility slat cover 204 has the same convex outer profile as outer side or surface 6 of slat 1, when the rolling shutter is in the extended or closed position.

Utility slat interior space 212 may be sized and shaped to receive a variety of different features, such as a cut-resistant bar or other device to increase the security of the rolling shutter. In one embodiment, a locking device is received in interior space 212 to secure the rolling shutter in a closed or partially closed position. One or more flanges 218 may project into interior space 212 from base 206, cover 204, and/or walls 208 and 210 to position and support the locking device or other feature within the interior space.

The rolling shutter may include an end retention system that comprises a retaining rail or guide track positioned at the sides of the opening in the host structure. The guide track is configured to receive the ends of the slats and secure the slats in position to cover the opening of the structure. An end retention device is secured to the ends of the slats, and is received in the guide track to align and prevent disengagement of the slat ends from the guide track. The ends of the slats may be configured with a receptacle for receiving an end retention device, such as a fastener with a washer that is retained within a channel of the guide track. Examples of end retention systems are described in U.S. Pat. Nos. 8,616,261 and 8,925,617 to Miller, which are incorporated herein by reference.

Figure 21B:
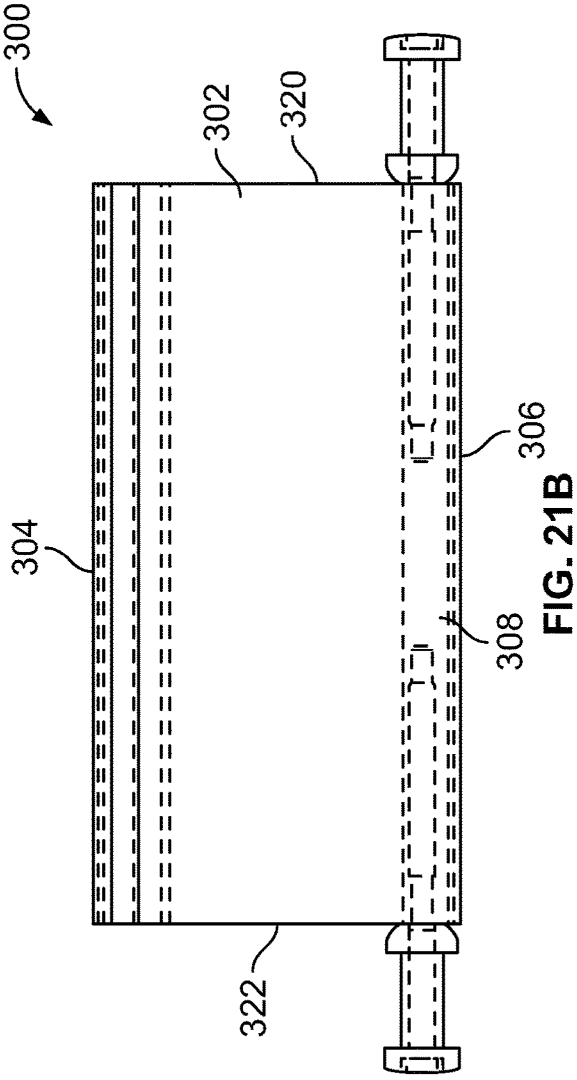
FIG. 21B is a front view of the rolling shutter slat and end retention device of FIG. 21A, showing hidden lines.
Figure 21C:
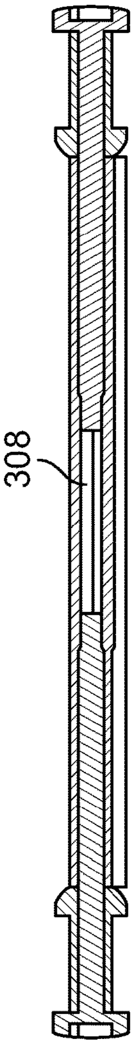
FIG. 21C is a bottom section view of the rolling shutter slat and end retention device of FIG. 21A.
Figure 20:
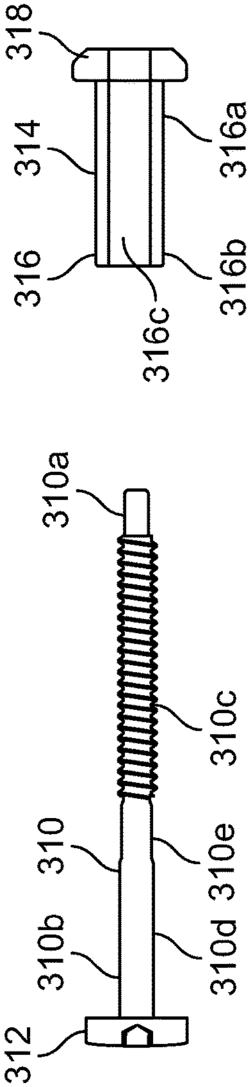
FIG. 20 is a side section view of an embodiment of an end retention device for a rolling shutter slat, comprising a retaining screw and bushing.
Figure 21A:
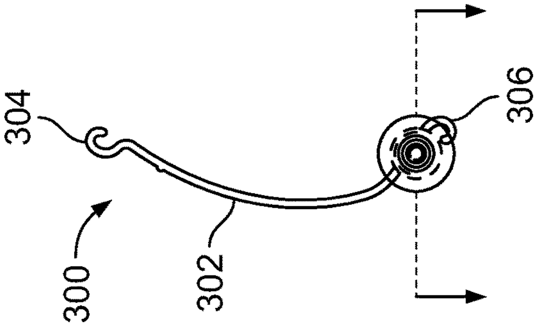
FIG. 21A is a side view of the end retention device of FIG. 20 installed in an embodiment of a rolling shutter slat.

FIGS. 20 and 21 show an embodiment of a slat and an end retention device. Slat 300 has a body 302, an engaging track 304, and a receiving track 306. Receiving track 306 is similar to receiving track 14 of slat 1, and includes a receptacle 308 for receiving the end retention device that is similar to receptacle 34 (FIG. 1C).

The end retention device comprises a first end that secures the end retention device to a slat, and a second end that engages a guide track. In one embodiment, the end retention device is a retaining screw 310 with first and second ends 310*a* and 310*b*. End 310*a* includes a threaded portion 310*c* for securing the retaining screw to slat 300. A retaining screw head or flange 312 is positioned at end 310*b*, for engaging a guide track. In a preferred embodiment, end 310*b* includes an unthreaded portion 310*d* adjacent to flange 312.

In one embodiment, the end retention device further includes a bushing 314 that comprises a cylindrical body 316 with first and second ends 316*a* and 316*b*, and a bore 316*c* that is sized and shaped to receive retaining screw 310. A bushing head or flange 318 is positioned at the first end 316*a* of body 316. The end retention device is assembled by inserting retaining screw 310 through bore 316*c* and positioning bushing 314 at end 310*b*. Bushing end 136*b* is positioned proximal or adjacent to retaining screw flange 312, such that bushing flange 318 and the retaining screw flange are spaced apart by body 316. In a preferred embodiment, bushing 314 is positioned over the unthreaded portion 310*d* of retaining screw 310.

Retaining screw end 310*a* is received in slat receptacle 308, to couple the end retention device to the ends 320 and/or 322 of slat 300. In one embodiment, receptacle 308 of slat 300 is sized and shaped to provide a screw boss for retaining screw threaded portion 310*c*, to secure the end retention device to the slat. Retaining screw flange 312 (and spaced apart bushing flange 318) projects from slat ends 320 and 322, to engage the guide track of an end retention system.

Under load conditions, the end retention device experiences high stresses at the point of engagement with the slat. In one embodiment, the unthreaded portion 310*d* of retaining screw 310 includes a section 310*e* adjacent to threaded portion 310*c*, that has a diameter that is approximately the diameter of the screw boss (receptacle 308). Retaining screw 310 is configured such that unthreaded section 310*e* becomes embedded within receptacle 308 and slat end 320 (or 322), to provide a stronger connection than if this transition occurred over a threaded portion of the screw, as shown in FIGS. 21B and 21C.

Figure 22A:
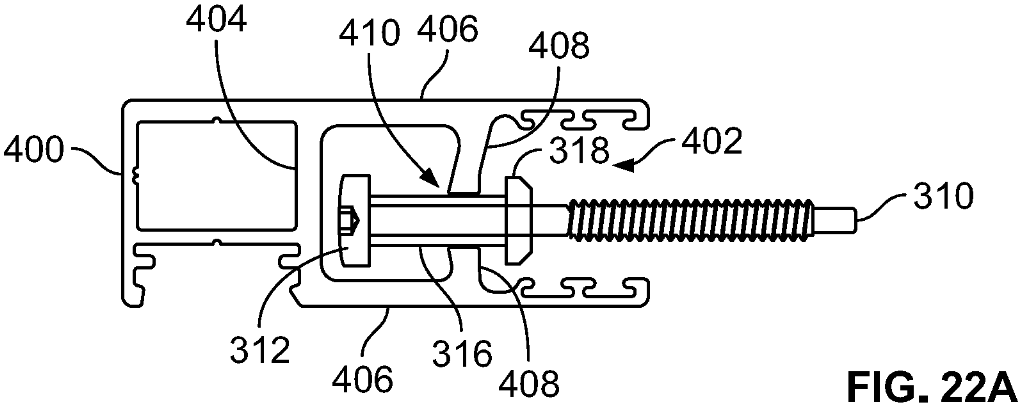
FIG. 22A is a top section view of an embodiment of a guide track and the end retention device of FIG. 20.

FIG. 22A shows an embodiment of a guide track 400, that comprises a U-shaped channel 402 formed by a base 404 and walls 406. Channel 402 is sized and shaped to receive a slat end 320 or 322 coupled to an end retention device, to retain and guide the longitudinal movement of the slat within the channel. In one embodiment, flanges 408 project from walls 406 into channel 402, to form a guide slot 410 that is sized and shaped to receive bushing body 316. The movement of bushing body 316 in slot 410 guides the longitudinal movement of the end retention device (retaining screw 310 and bushing 314) and slat 300 within guide track channel 402. Retaining screw flange 312 has a larger width or diameter than the width of guide slot 410, such that the retaining screw flange is captured by the guide slot and is prevented from being withdrawn from channel 402. Bushing flange 318 also has a larger width or diameter than guide slot 410, such that the transverse movement of the end retention device in guide track 400 is limited by the length of bushing body 316 between the retaining screw flange and bushing flange.

Figure 22B:
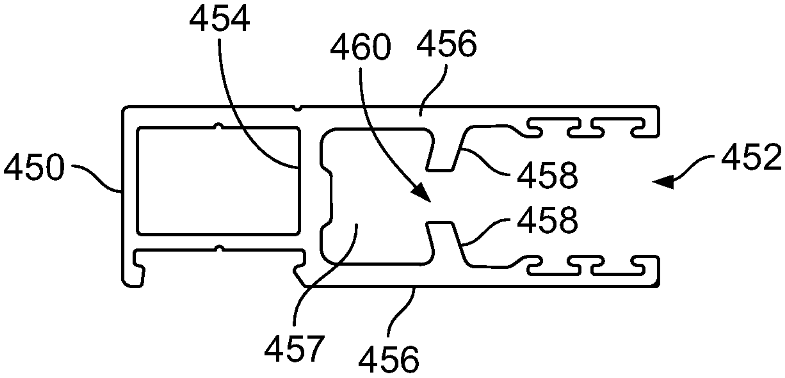
FIG. 22B is a top section view of an alternative embodiment of a guide track and the end retention device of FIG. 20.

In the embodiment of FIG. 22A, flanges 408 have different heights, such that slot 410 is positioned off-center within channel 402, and the end retention device and slat 300 are positioned closer to one of walls 406 of guide track 400. FIG. 22B shows an alternative embodiment of a guide track 450 with a similar structure to guide track 400, that comprises a channel 452 defined by base 454 and walls 456. Flanges 458 project from walls 456 into channel 452, to form a guide slot 460 that is sized and shaped to receive bushing body 316 and capture retaining screw flange 312. Guide slot flanges 458 project from walls 456 at approximately the same height, such that guide slot 460 is equidistant from walls 456 and is centered within channel 452.

Figure 23A:
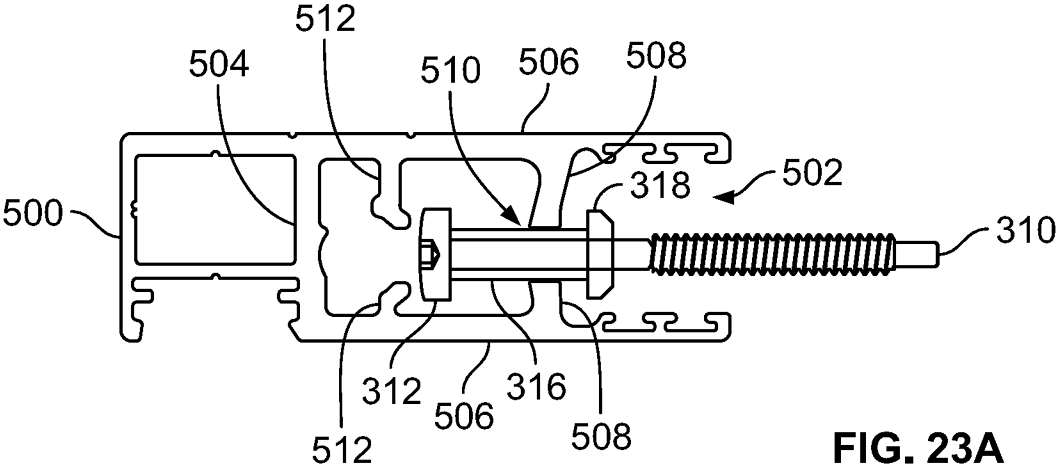
FIG. 23A is a top section view of an alternative embodiment of a guide track and the end retention device of FIG. 20.

In yet another embodiment, the guide track may include a stop within the channel that limits the transverse movement of the end retention device and slat 300 into the guide track channel. FIG. 23A shows a guide track 500 with a similar structure to guide track 400, that comprises a channel 502 defined by base 504 and walls 506. Flanges 508 project from walls 506 into channel 502, to form a guide slot 510 that is sized and shaped to receive bushing body 316 and capture retaining screw flange 312. A stop comprising one or more stop flanges 512 is formed within channel 502, between base 504 and guide slot flanges 508. Stop flanges 512 are positioned to contact retaining screw flange 312 as the end retention device and slat 300 move transversely into guide track channel 502.

Similarly to guide track 400, guide slot flanges 508 project from walls 506 at different heights, such that guide slot 510 is positioned off-center within channel 502, and the end retention device and slat 300 are positioned closer to one of walls 506 of guide track 500. In one embodiment, each stop flange 512 projects from wall 506 at about the same height as the guide slot flange 508 projecting from the same wall.

Figure 23B:
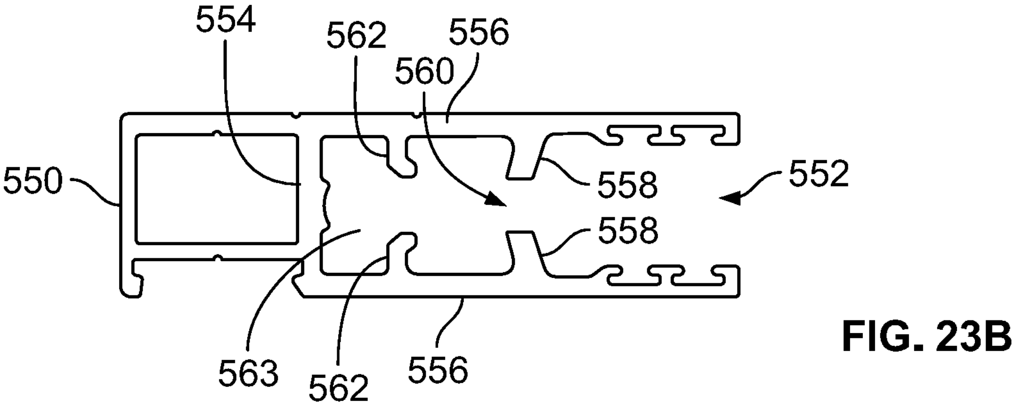
FIG. 23B is a top section view of an alternative embodiment of a guide track and the end retention device of FIG. 20.

FIG. 23B shows an alternative embodiment of a guide track 550 with a similar structure to guide track 500, that comprises a channel 552 defined by base 554 and walls 556. Flanges 558 project from walls 556 into channel 552, to form a guide slot 560 that is sized and shaped to receive bushing body 316 and capture retaining screw flange 312. A stop comprising one or more stop flanges 562 is formed within channel 552, between base 554 and guide slot flanges 558. Stop flanges 512 are positioned to contact retaining screw flange 312 as the end retention device and slat 300 move transversely into guide track channel 502.

Guide slot flanges 558 project from walls 556 at approximately the same height, such that guide slot 560 is equidistant from walls 556 and is centered within channel 552. In one embodiment, each stop flange 562 projects from wall 556 at about the same height, and preferably project from wall 556 at about the same height as guide slot flanges 558.

The guide track may also include a stop within the channel, to prevent the rolling shutter from being inadvertently raised out of the guide track—e.g., when the rolling shutter is retracted to the open position. For example, a spring may be positioned in the channel at the top of the guide track to provide a resilient stop (not shown). A slat in the rolling shutter (e.g., a base slat) may include a stop bar (not shown) projecting into the channel and aligned to engage the channel stop and prevent inadvertent removal of the rolling shutter from the guide track. In one embodiment, one or more flanges that project within the channel may be configured to form or receive a guide channel stop. For example, flanges 458 and base 454 may form a receptable 457 (FIG. 22B) within channel 452 that is sized and shaped to receive a stop, such as a spring (not shown). Similarly, flanges 562 and base 554 may form a receptacle 563 (FIG. 23B) within channel 552 that is sized and shape to receive a stop.

In one embodiment, the rolling shutter system includes a base slat with an end retention system to increase the security provided in a closed or extended position. Base slat end retention increases resistance to pry and prevents the disengagement of lock bars from guide rails. In a preferred embodiment, the base slat incorporates the same guide track and end retention system as the rolling shutter slats. For example, the base slat may include a receptacle for receiving an end retention device, such as such as a receptacle 34 or 308 that serves as a screw boss for an end retention device, such as retaining screw 310 and bushing 314.

FIGS. 24-31 show various aspects of the installation of a rolling shutter system at the opening of a host structure. In one embodiment, the rolling shutter system includes a frame comprising one or more guide tracks positioned at the periphery of the opening in the host structure. The rolling shutter is commonly secured to the top of the opening and the guide tracks are positioned at either side of the opening. As the rolling shutter is lowered to cover the opening, the guide tracks retain and guide the ends of the slats as they are extended toward the bottom of the opening and into the closed position.

Figure 24:
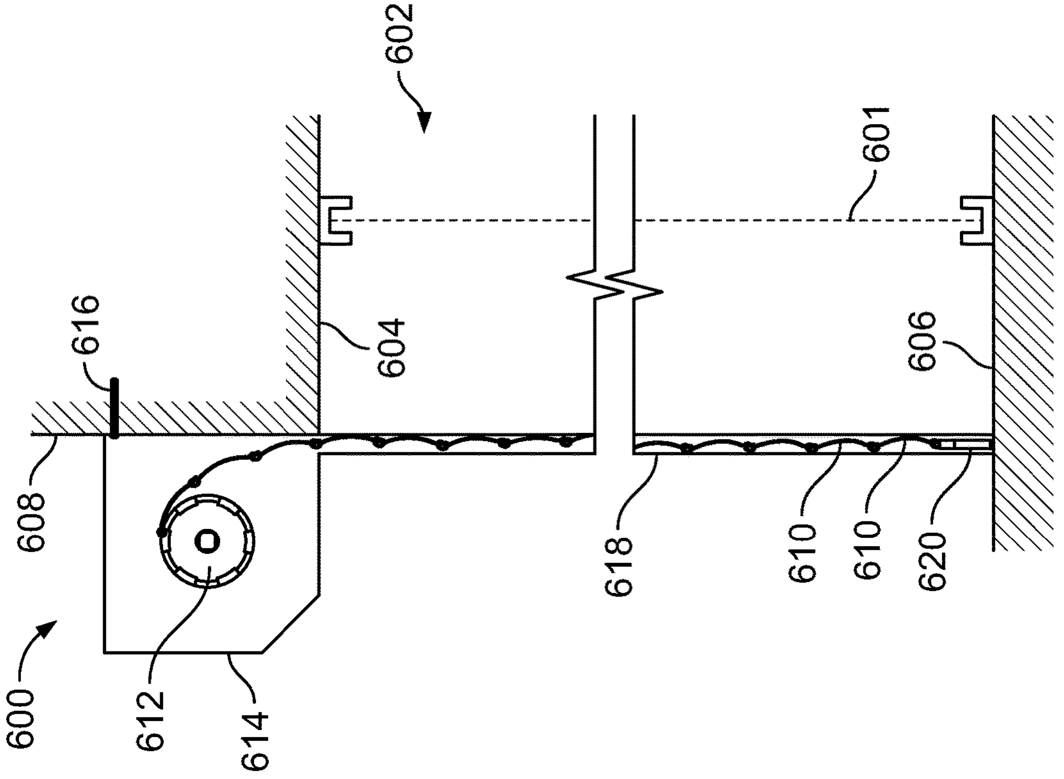
FIG. 24 is a side section view of an embodiment of a rolling shutter mounted at the opening of a structure.

FIG. 24 shows an embodiment of a rolling shutter system 600 installed by a wall mount at the opening 602 of a host structure, such as for a window 601. Opening 602 has a top 604, a bottom 606, and a wall 608. Rolling shutter system 600 comprises multiple linked slats 610 that form the rolling shutter. Slats 610 are coupled to a spindle 612 and covered by a housing 614 that is sized and shaped to receive and store the rolling shutter in a retracted (wound) position. Housing 614 may be secured to wall 608 at the top of opening 602, using one or fasteners 616 such as screws, bolts, nails, or other fasteners known in the art. In a preferred embodiment, fastener 616 is a concrete or masonry anchor, such as a Tapcon®. The ends of slats 610 are captured in one or more guide tracks 618, that align and secure the slats in position to cover the opening. The rolling shutter may include a base slat 620, which may also have ends that are received in guide tracks 618.

Figure 25:
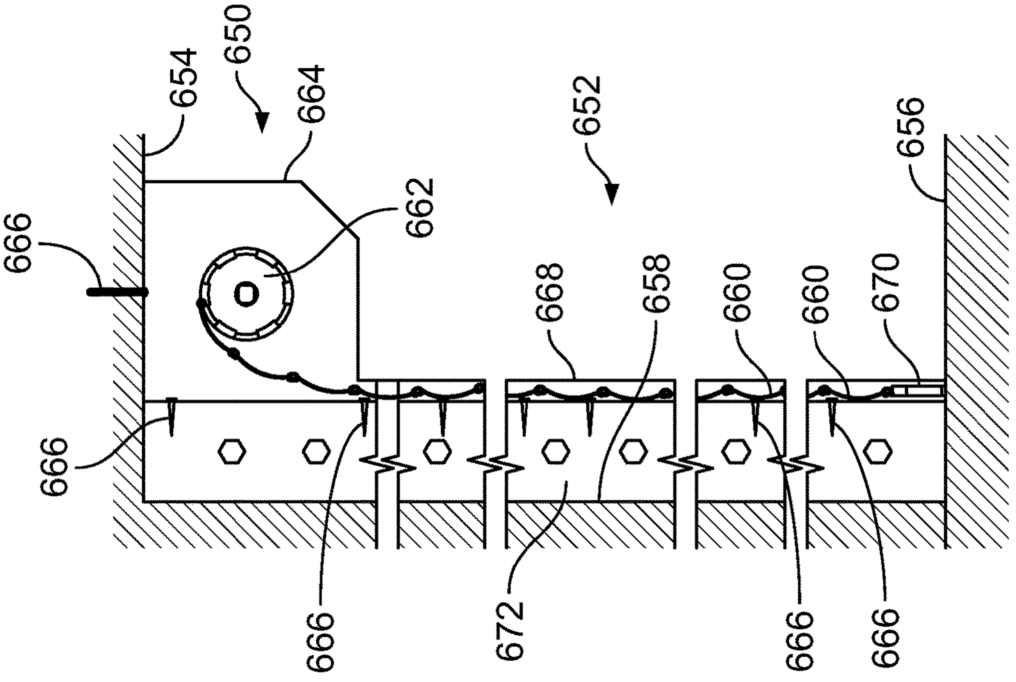
FIG. 25 is a side section view of an alternative embodiment of a rolling shutter mounted at the opening of a structure.

FIG. 25 shows an alternate embodiment of a rolling shutter system 650 installed by a trap mount. The opening of a host structure 652 has a top 654, a bottom 656, and a side wall 658. Rolling shutter system 650 comprises multiple linked slats 660 that form the rolling shutter. The slats are coupled to a spindle 662 and covered by a housing 664 that is sized and shaped to receive and store the rolling shutter in a retracted (wound) position. Housing 664 may be secured to top 654 of opening 652, using one or fasteners 666. The ends of slats 660 are captured in guide tracks 668, that align and secure the slats in position to cover the opening. Guide tracks 668 are secured to side wall 658 by a trap mount. A post 672 is secured to side wall 658, and guide tracks 668 (and housing 664) are secured to post 672 using one or more fasteners, such as fasteners 666. The rolling shutter may include a base slat 670, which may also have ends that are received in guide tracks 668.

Figure 26:
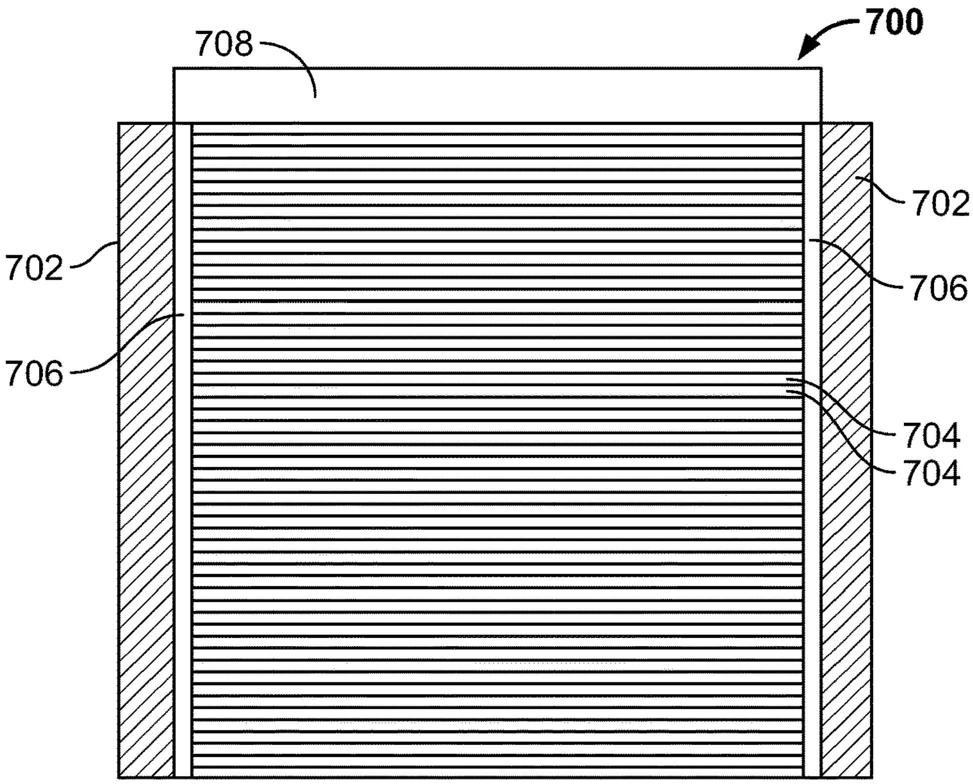
FIG. 26 is a front view of an embodiment of a rolling shutter installed at the opening of a structure.

FIG. 26 shows an embodiment of a rolling shutter system 700, comprising a single rolling shutter installed over the opening of a host structure having side walls 702. A rolling shutter curtain comprises multiple slats 704 that span the width of the opening between side walls 702. The ends of slats 704 are received in guide tracks 706 that are positioned at the sides of the opening and secured to side walls 702. In a retracted position, slats 704 are stored in a housing 708 positioned at the top of the opening.

Figure 27:
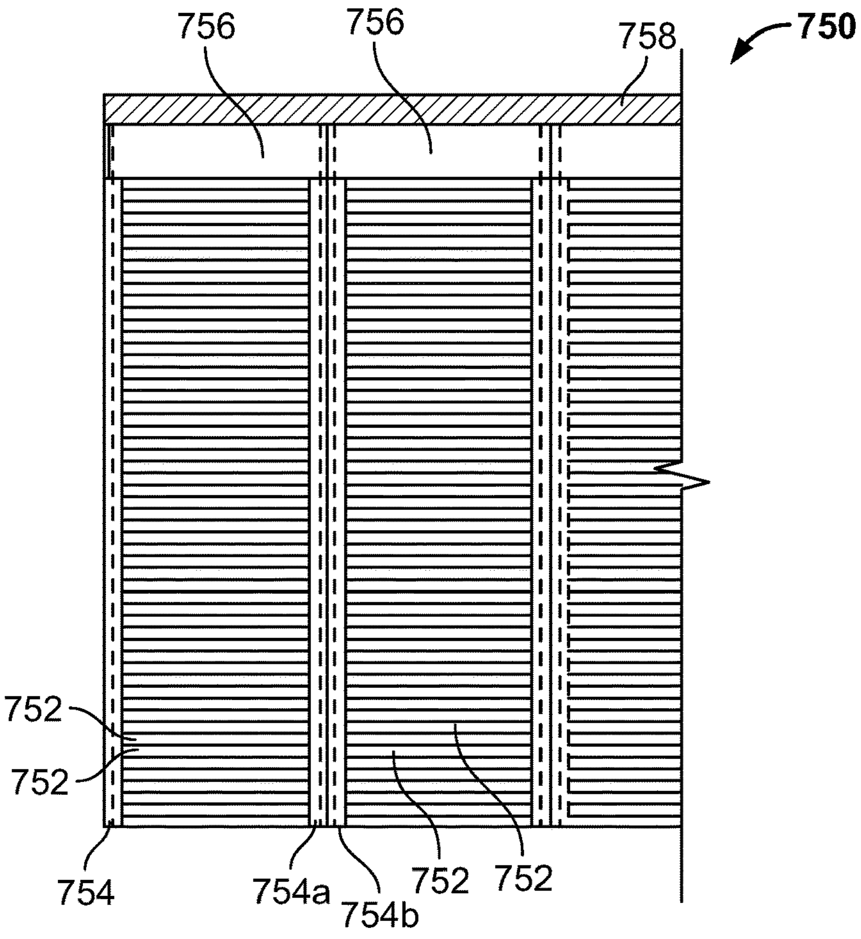
FIG. 27 is a front view of an embodiment of multiple rolling shutters installed at the opening of a structure.

FIG. 27 shows an alternative embodiment of a rolling shutter system 750, where multiple rolling shutter curtains are positioned side-by-side to span the width of an opening in a host structure. Each rolling shutter curtain comprises multiple slats 752, guide tracks 754 and a housing 756. Adjacent rolling shutter curtains have housings 756 positioned side-by-side and secured to the top 758 of the opening. Between adjacent rolling shutters, two guide tracks **754*a* and 754*b* are positioned back-to-back to receive the ends of slats 752 of their respective rolling shutter curtains. In one embodiment, guide tracks 754*a* and 754*b*** are secured to a vertical support internal to the opening (not shown), such as an internal mullion.

Figure 28:
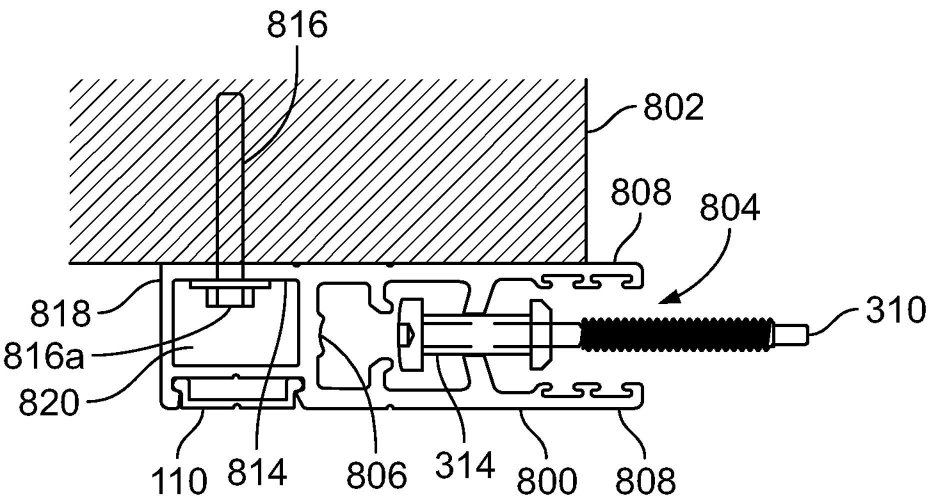
FIG. 28 is a top section view of the guide track and end retention device of FIG. 23B, installed on a building structure by a wall mount.

Referring to FIGS. 28-31, embodiments for securing a guide track 800 at the opening of a host structure, such as to a side wall 802. In the embodiment of FIG. 28, guide track 800 is mounted to wall 802 by a wall mount. Guide track 800 comprises a U-shaped channel 804 formed by a base 806 and walls 808. An end retention device (retaining screw 310 and bushing 314) is received in channel 802 to couple the end of a slat (not shown) to guide track 800. A flange 814 extends from base 804 for receiving a fastener 816 to secure guide track 800 to wall 802. For example, fastener 816 may be an anchor that extends through flange 814 and into wall 802.

Figure 12:
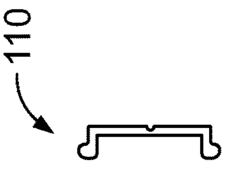
FIG. 12 is a side section view of an embodiment of a cover for a guide track of a rolling shutter system.

In one embodiment, flange 814 forms a channel that is sized and shaped to enclose the head **816*a* of fastener 816. As shown in FIG. 28, an arm 818 extends from flange 814, opposite from guide track base 804. Flange 814, arm 818, and guide track base 804 form a U-shaped channel 820 that receives fastener head 816*a*. A cover may be positioned at the opening of channel 820 to conceal fastener head 816*a*, such as snap fit cover 110 (FIG. 12**).

Figure 29:
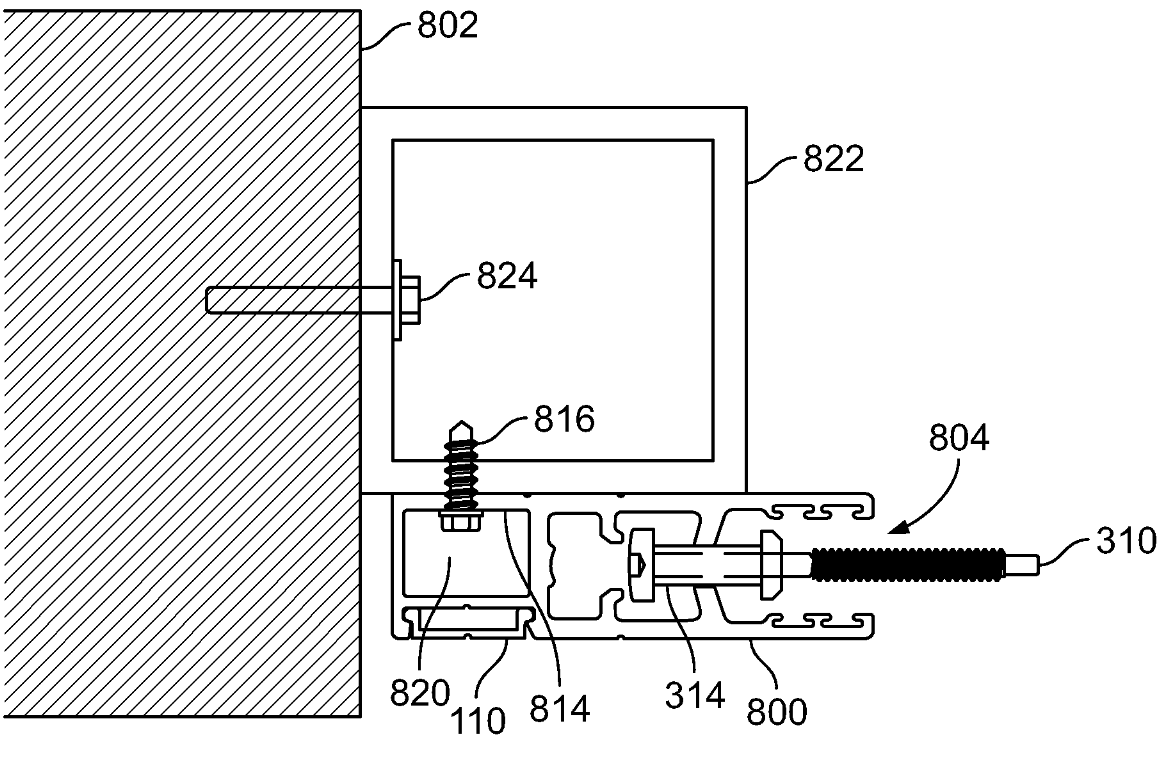
FIG. 29 is a top section view of the guide track and end retention device of FIG. 23B, installed on a building structure by a trap mount.

In the embodiment of FIG. 29, guide track 800 is secured to wall 802 by a trap mount. An intermediate member 822 is fastened to opening wall face 802 by a fastener 824, such as an anchor. Member 822 may be a vertical post, such as a square or rectangular tube. Guide track 800 is secured to member 822 transverse or at right angles to wall face 802, to receive the rolling shutter slats (not shown) that extend across the opening. In one embodiment, guide track 800 is secured to member 822 by a fastener 816 that extends through flange 814 and into member 822, such as a metal screw.

Figure 30:
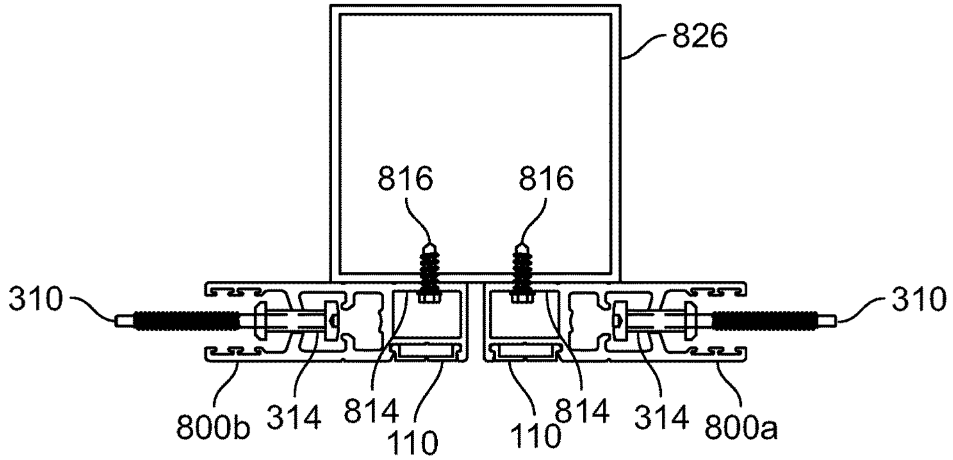
FIG. 30 is a top section view of two guide tracks and end retention devices of FIG. 23B, installed on a mullion by a face mount.

In the embodiment of FIG. 30, two guide tracks **800*a* and 800*b* are secured to an internal mullion 826 by a face mount. Guide tracks 800*a* and 800*b* are positioned adjacent to each other in a back-to-back orientation on the same face of mullion 826. Each guide track 800*a* and 800*b* is secured to mullion 826 in a similar manner as the wall mount shown in FIG. 28. A fastener 816 (e.g., metal screw) extends through flange 814 and into mullion 826**.

Figure 31:
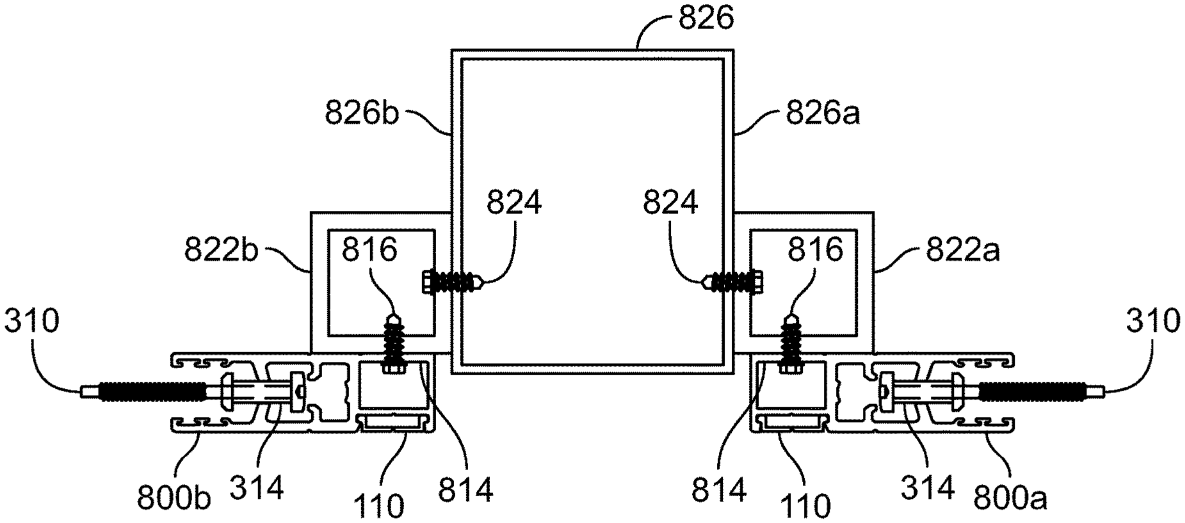
FIG. 31 is a top section view of two guide tracks and end retention devices of FIG. 23B, installed on a mullion by a trap mount.

In the embodiment of FIG. 31, two guide tracks **800*a* and 800*b* are secured to an internal mullion 826 by a trap mount. Guide tracks 800*a* and 800*b* are respectively secured to different faces of mullion 826 through separate intermediate members 822*a* and 822*b*, in a similar manner as the trap mount shown in FIG. 29. In one embodiment, members 822*a* and 822*b* are respectively secured to opposite faces 826*a* and 826*b* of mullion 826 by fasteners 824 (e.g., metal screws). Guide tracks 800*a* and 800*b* are respectively secured to members 822*a* and 822*b* transverse or at right angles to mullion faces 802 by fasteners 816 (e.g., metal screws). The installed guide tracks 800*a* and 800*b*** are oriented back-to-back and extend parallel to each other to receive the rolling shutter slats (not shown) that extend across the opening.

Referring to FIGS. 32-35, a rolling shutter system comprising an alternative embodiment of a modular utility slat 900 is shown. Utility slat 900 is configured with an interior space for receiving additional functionality for the rolling shutter. For example, the interior space may contain a locking device for the rolling shutter, reinforcement, or other feature. Where reinforcement is required, the interior space may contain an anti-cut material or an anti-cut device to increase resistance to forced entry by cutting with a grinder, reciprocating saw, or circular saw.

Figure 32A:
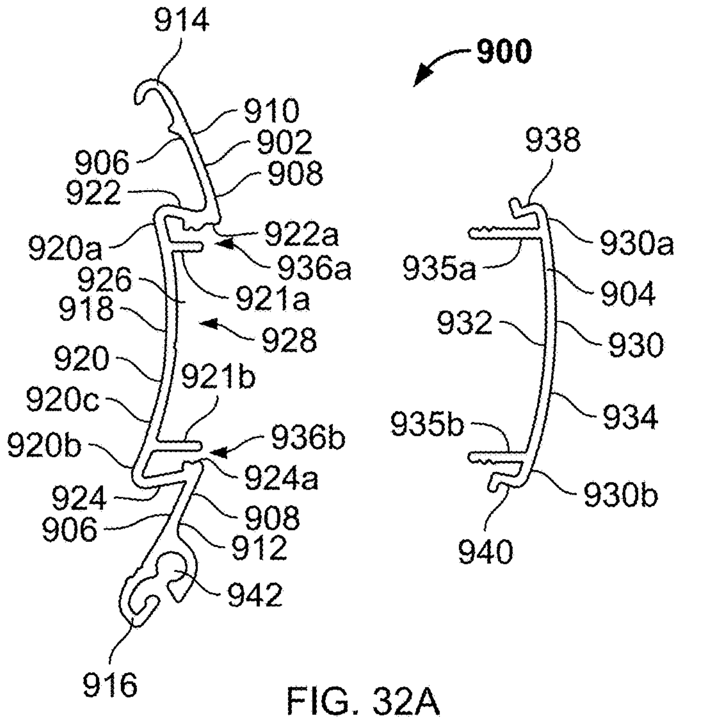
FIG. 32A is a side section view of an embodiment of a modular utility slat for a rolling shutter, showing the assembly of a slat body and a slat cover.
Figure 32B:
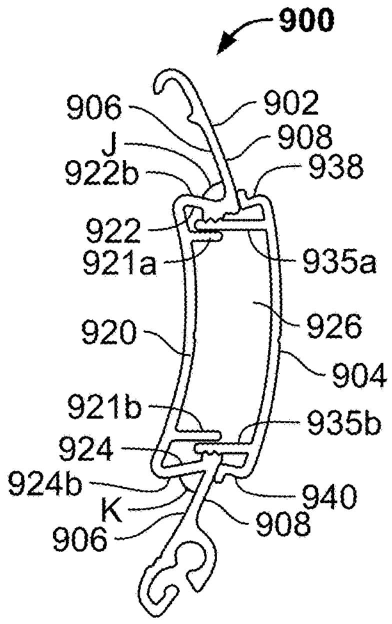
FIG. 32B is a side section view of the assembled utility slat of FIG. 32A.

Utility slat 900 preferably has the same general configuration the other slats of the rolling shutter, such as slat 1 described above. As shown in FIGS. 32A and 32B, modular utility slat 900 comprises a single-walled body 902, and a cover 904. Slat body 902 has a curvature with an inner side or surface 906 with a concave curve, an outer side or surface 908 with a convex curve, a top edge 910, and a bottom edge 912. An engaging track 914 is positioned at edge 910, and a receiving track 916 is positioned at edge 912. Engaging track 914 and receiving track 916 are configured similarly to the other slats of the rolling shutter—e.g., engaging track 12 and receiving track 14 of slat 1.

A U-shaped pocket or channel 918 is formed in slat body 902. Slat channel 918 comprises a channel base 920 with ends **920*a* and 920*b*, and walls 922 and 924 that respectively extend from channel ends 920*a* and 920*b*. Channel walls 922 and 924 respectively have ends 922*a* and 924*a* opposite channel base 920, that are positioned at body 902. Channel base 920 and channel walls 922 and 924 define an interior space 926, with a channel opening 928 in slat body 902 defined between channel wall ends 922*a* and 924*a*. In one embodiment, channel 918 and channel walls 922 and 924 project from slat inner surface 906, and channel opening 928 is at or opens to slat outer surface 908**.

Cover 904 is removably coupled to slat body 902 to enclose interior space 926. Cover 904 has a body 930 with an inner surface 932, an outer surface 934, and ends **930*a* and 930*b*. In one embodiment, cover body 930 has a curvature with an inner surface 932 having a concave curve that faces interior space 926, and an outer surface 934 having a convex curve. In one embodiment, cover ends 930*a* and 930*b* are respectively removably coupled to channel wall ends 922*a* and 924*a*. Cover 904 may be removably coupled to slat body 902** by various means known in the art, such as snap fit insertion or interference fit (press fit).

In one embodiment, one or more flanges project from cover inner surface 932 for securing cover 904 to body 902. Cover flanges 935*a* and 935*b* are respectively positioned at cover ends 930*a* and 930*b*, and project from cover inner surface 932. Cover flanges 935*a* and 935*b* are removably coupled to channel wall ends 922*a* and 924*a*, such as by snap fit, interference fit, or other means known in the art. In a preferred embodiment, channel base 920 has one or more flanges that project into interior space 926 for coupling to cover flanges 935*a* and 935*b*. In the embodiment shown in FIGS. 32A and 32B, channel flanges 921*a* and 921*b* are respectively positioned at channel ends 920*a* and 920*b* and project into interior space 926. Channel flanges 921*a* and 921*b* may be respectively removably coupled to cover flanges 935*a* and 935*b*. In a preferred embodiment, channel flange 921*a* is spaced apart from channel wall end 922*a* to form an aperture 936*a*, and channel flange 921*b* is spaced apart from channel wall end 924*a* to form an aperture 936*b*. Apertures 936*a* and 936*b* are sized and shaped to respectively receive cover flanges 935*a* and 935*b*, to removably secure cover 904 to body 902. In one embodiment, cover flanges 935*a*, 935*b*, and channel flanges 921*a*, 921*b* and/or channel wall ends 922*a*, 924*a* may be formed with complementary detents to improve retention of the cover flanges.

In one embodiment, channel walls 922 and 924 project from slat inner surface 906 and are sized and shaped to form a handle or grip to facilitate manually raising and lowering the rolling shutter from the inside of the shutter. Channel walls 922 and 924 respectively have channel wall outer surfaces 922*b* and 924*b* (FIG. 32B) that are contiguous with slat inner surface 906. In a preferred embodiment, acute angles "J" and "K" are respectively formed between channel wall outer surfaces 922*b* and 924*b* and their adjacent slat inner surfaces 906, to facilitate the operator's grip.

Cover 904 may also be configured to provide a handle. In one embodiment, cover 904 is U-shaped, with cover arms 938 and 940 respectively positioned at cover ends 930*a* and 930*b*, and extending toward cover inner surface 932. When cover 904 is secured to slat body 902, cover arms 938 and 940 contact and project from slat outer surface 908 to provide a handle or grip to facilitate manually raising and lowering the rolling shutter from the outside of the shutter.

Figure 34:
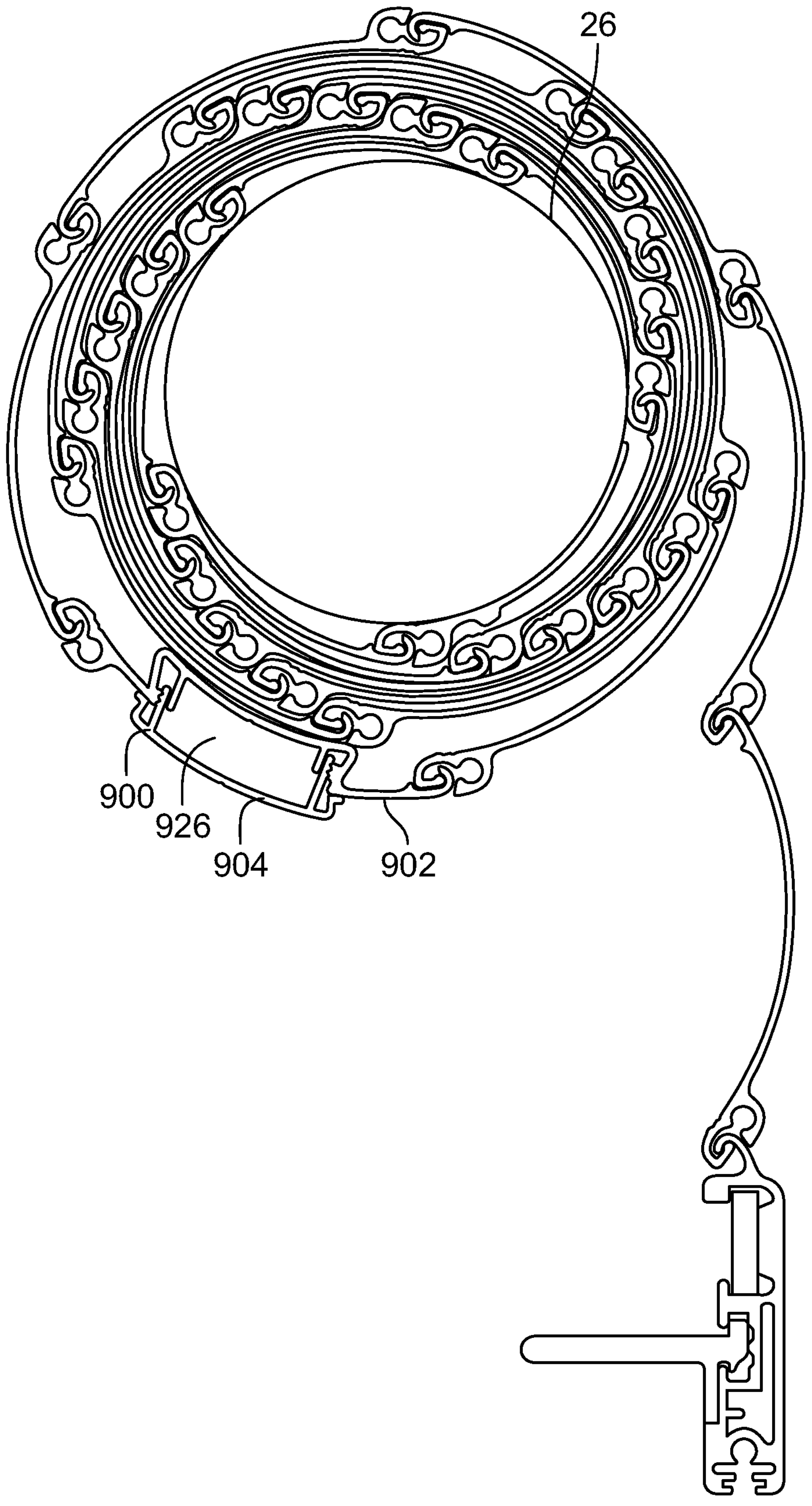
FIG. 34 a side section view of an embodiment of a rolling shutter in a retracted position, comprising the utility slat of FIG. 32B.

FIG. 34 shows utility slat 900 incorporated in a rolling shutter in the retracted position, with the rolling shutter slats wound about spindle 26 in a series of successive windings of tightly nested slats. Utility slat 900 is preferably configured to integrate into the tightly nested configuration of the slats in the retracted position. In one embodiment, utility slat 900 has a height and curvature that is approximately the same as height and curvature of one or more slats in the same winding. Those of skill in the art will appreciate that channel 918 will prevent utility slat 900 from tightly nesting with the slats in a previous winding. To minimize the profile of the rolling shutter in the retracted position, a utility slat winding that includes utility slat 900 may require different sized slats and/or a different number of slats than the other windings in the rolling shutter.

Figure 36A:
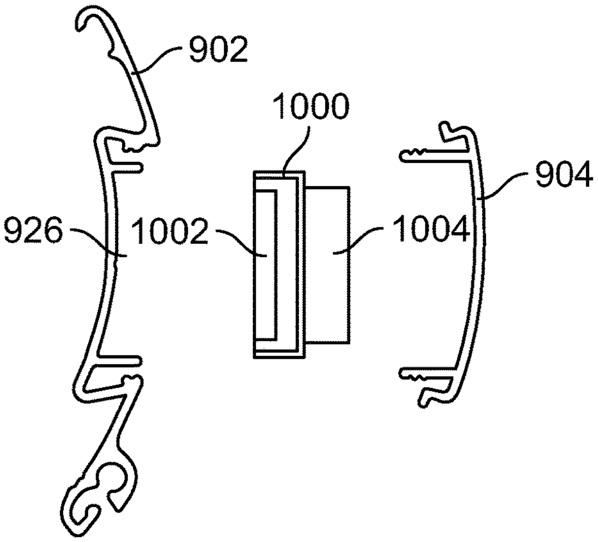
FIG. 36A is a side section view of an embodiment of a modular utility slat for a rolling shutter, showing the assembly of a slat body, lock, and a slat cover.
Figure 36B:
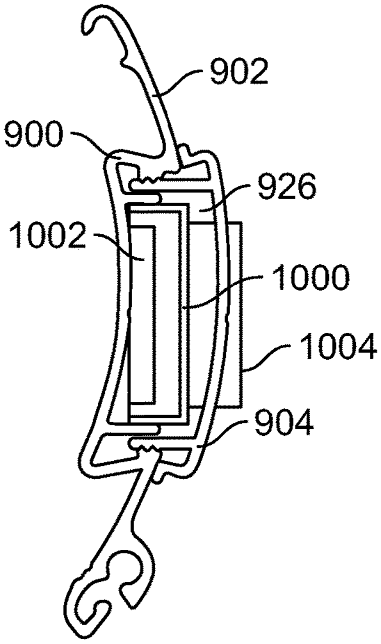
FIG. 36B is a side section view of the assembled utility slat of FIG. 36A.
Figure 36C:
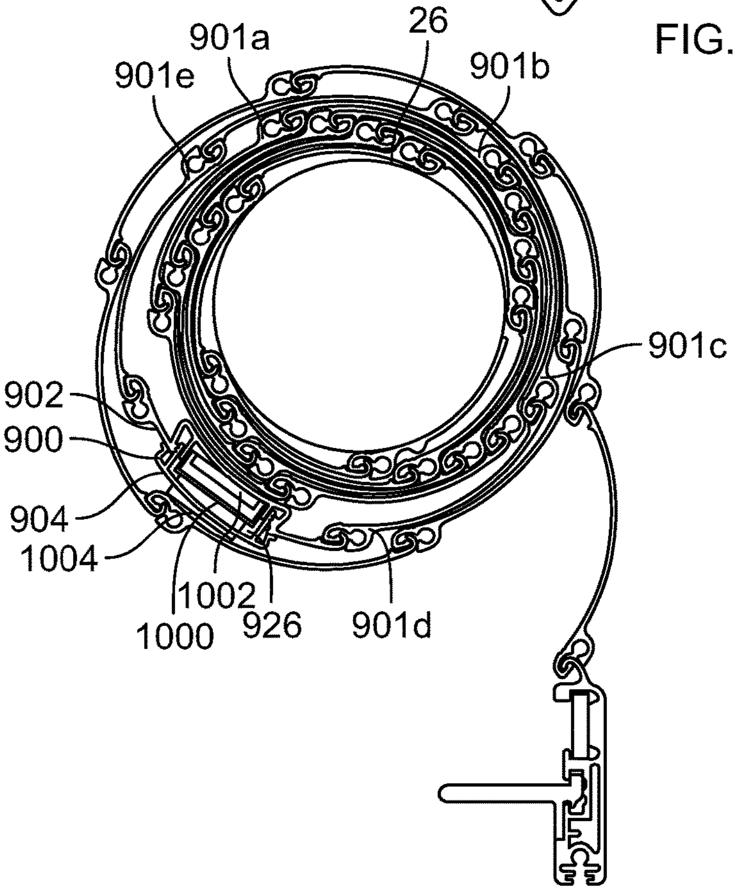
FIG. 36C a side section view of an embodiment of a rolling shutter in a retracted position, comprising the utility slat of FIG. 36B.

In the embodiment of FIG. 36C, a utility slat winding includes utility slat 900 and slats 901*a*-901*e*. At least one of the other slats in the utility slat winding (e.g., slats 901*a*-901*e*) is tightly nested with the slats of the previous winding. In a preferred embodiment, at least first slat 910*a* in the winding is tightly nested with the slats of the previous winding, and more preferably at least the first three slats 901*a*, 901*b*, and 901*c* in the winding are tightly nested with the slats of the previous winding. In one embodiment, utility slat 900 has a height and curvature that is about the same as the height and curvature of a tightly nested slat in the winding, and preferably the first slat 901*a* in the utility slat winding. In a further embodiment, the two intermediate slats 901*d* and 910*e* are positioned on either end of utility slat 900 (i.e. coupled to the engaging track and receiving track of the utility slat), and have different heights and curvatures than the utility slat (and the initial slat in the winding 901*a*).

Channel base 920 may also have a curvature with an outer side or surface 920*c* opposite or that faces away from interior space 926, and that has a concave curve that conforms to the convex curve of the slat outer surface 6 of a slat in the previous winding. In one embodiment, channel base outer surface 920*c* may have a concave curve that conforms to the convex curve of the slat outer surface 6 of a slat in the previous winding, and/or that is approximately concentric with the concave curve of utility slat inner surface 906. Similarly, cover outer surface 934 may also have a convex curve that conforms to the concave curve of the slat inner surface 4 of a slat in the successive winding, and/or that is approximately concentric with the convex curve of utility slat outer surface 908.

As discussed above, the height of the slats in the rolling must increase in each successive winding to accommodate the increasing circumference and maintain the same number of slats in each winding. To enable utility slat 900 to be positioned at different locations in the sequence or series of slats in the rolling shutter, the utility slat may be provided in multiple versions having different heights—i.e. the maximum vertical height of utility slat 900 between the engaging track 914 and receiving track 916. In one embodiment, the height of the utility slat 900 increases with the distance of the utility slat winding from the spindle. In a preferred embodiment, utility slat 900 has approximately the same height as at least one of the other slats in the same winding, as discussed above.

Figure 33A:
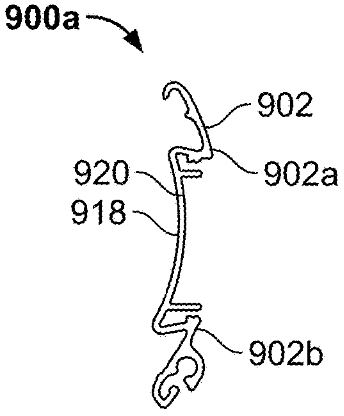
FIG. 33A a side section view of the utility slat body of FIG. 32A, for comparison of its height.
Figure 33B:
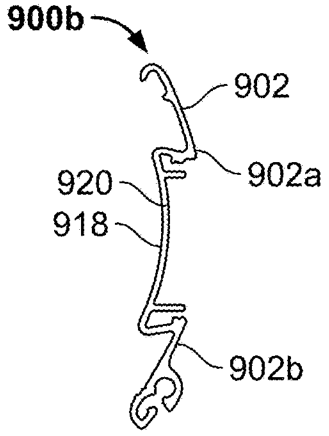
FIG. 33B a side section view of the utility slat body of FIG. 32A, in a different size for comparison with FIG. 33A.
Figure 33C:
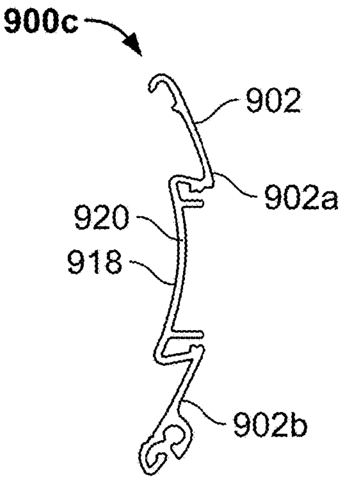
FIG. 33C a side section view of the utility slat body of FIG. 32A, in a different size for comparison with FIG. 33A.

FIGS. 33A, 33B, and 33C show comparative examples of utility slat 900 having three versions 900*a*, 900*b*, and 900*c* with different heights. In one embodiment, utility slats 900*a*, 900*b*, and 900*c* have identical channels 918 to allow the same cover 930 to be removably secured to any of slats 900*a*, 900*b*, and 900*c*. In a preferred embodiment, cover 930 has a common geometry across different utility slat heights to accommodate consistent lock assemblies. Utility slats 900*a*, 900*b*, and 900*c* have an increasing height and radius of curvature, to allow the slats to be located increasingly distal to the rolling shutter spindle, as discussed above. In one embodiment, the different slat heights are determined by modifying the combined lengths of the body segments 902*a* and 902*b* that extend on either side of channel 918. In a preferred embodiment, the lengths of both body segments 902*a* and 902*b* increase as the height of slat 900 increases.

Channel 918 may also vary between utility slats with respect to the curvature of channel base outer surface 920*c*. As discussed above, the radius of curvature of the slats in the rolling shutter must increase in each successive winding to accommodate the increasing circumference and maintain the same number of slats in each winding. In one embodiment, utility slats 900*a*, 900*b*, and 900*c* have channel base outer surfaces 920*c* with concave curves of increasing radius of curvature. In general, the radius of curvature increases with the height of utility slat 900 to allow channel base outer surface 920*c* to conform to the convex curve of the slat outer surface 6 of a slat in the previous winding and/or to maintain concentricity with the concave curve of utility slat inner surface 906.

Figure 35A:
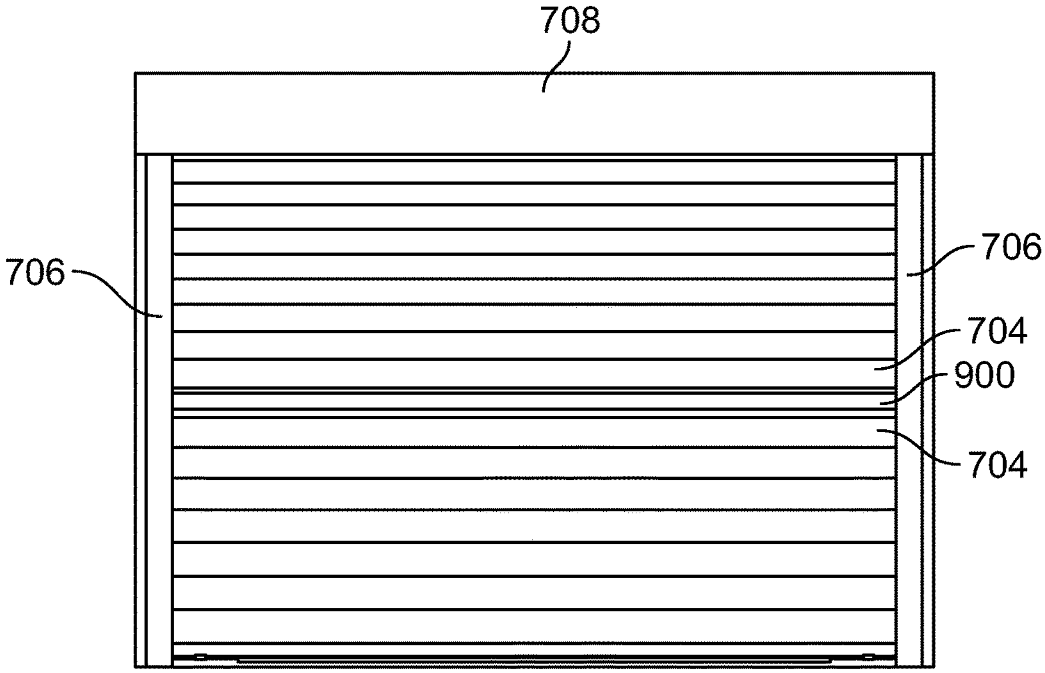
FIG. 35A is a front view of an embodiment of a rolling shutter in an extended position, comprising the utility slat of FIG. 32B.
Figure 35B:
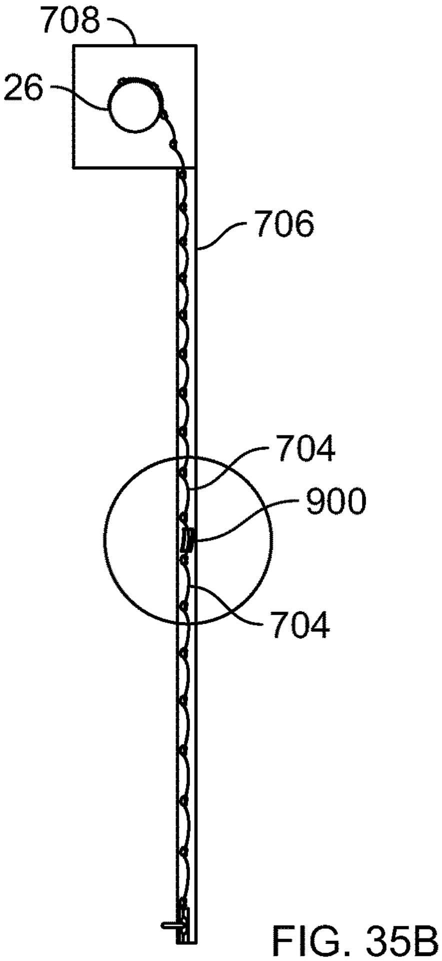
FIG. 35B is a side section view of the rolling shutter of FIG. 35A.
Figure 35C:
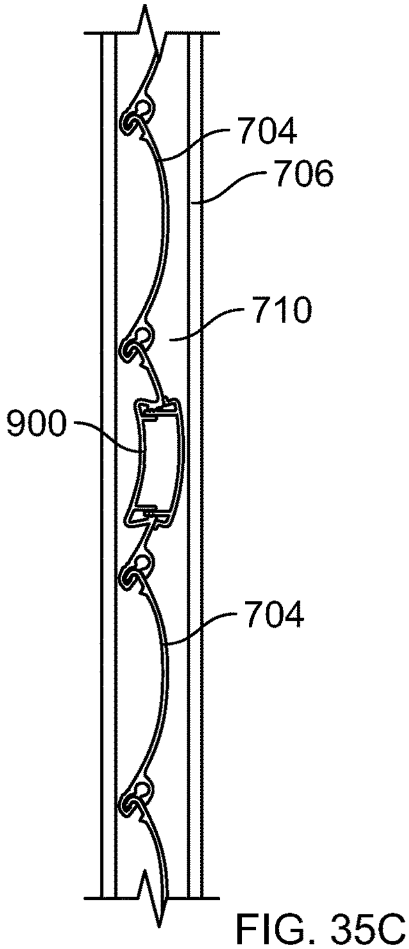
FIG. 35C is a detail, side section view of the rolling shutter of FIG. 35B.

FIGS. 35A-35C show utility slat 900 incorporated in a rolling shutter in an extended position. The rolling shutter is part of a rolling shutter system, such as rolling shutter system 700 described above (FIG. 26). Utility slat 900 is positioned approximately in the middle of the series of rolling shutter slats 704—e.g., at a height of the extended rolling shutter that is convenient for access by an operator. The ends of utility slat 900 and slats 704 are positioned in the guide track channel 710 of guide tracks 706. Utility slat receiving track 916 may include a receptacle 942 for receiving an end retention device (e.g., such as retaining screw 310 and bushing 314, described above) to prevent disengagement of utility slat 900 from guide tracks 706. Those of skill in the art will appreciate that the maximum width of utility slat 900 is less than the width of channel 710, to ensure that the rolling shutter travels freely within guide track 706. In one embodiment, utility slat channel 918 does not project beyond a plane extending across the concave inner surface 906 between utility slat engaging and receiving tracks 914 and 916.

In one embodiment, utility slat interior space 926 is sized and shaped to receive a rolling shutter locking device, as are known in the art. Removable utility slat cover 904 facilitates installation, servicing, and replacement of the locking device in the field (with appropriate tools) without the need for de-lacing the slats, which significantly reduces service time and cost. FIGS. 36A-36C show utility slat 900 with a conventional locking device 1000 installed in interior space 926. In one embodiment, locking device 1000 is a key lock with a sliding bolt or lock bar 1002 that is moveable between a locked position and an unlocked position. In the locked position, lock bar 1002 extends beyond an end of utility slat 900 to project toward and engage guide track 706, to secure the rolling shutter in position. In the unlocked position, lock 1002 is withdrawn into utility slat interior space 926 and away from engagement with guide track 706, to release and allow movement of the rolling shutter. In a preferred embodiment, locking device 1000 comprises two lock bars 1002 that extend from the opposite ends of utility slat 900. Examples of suitable locking devices are commercially available—e.g., Building Shutter Systems Models SL-005-01 and SLO-051-01 (Belgium).

Figure 37A:
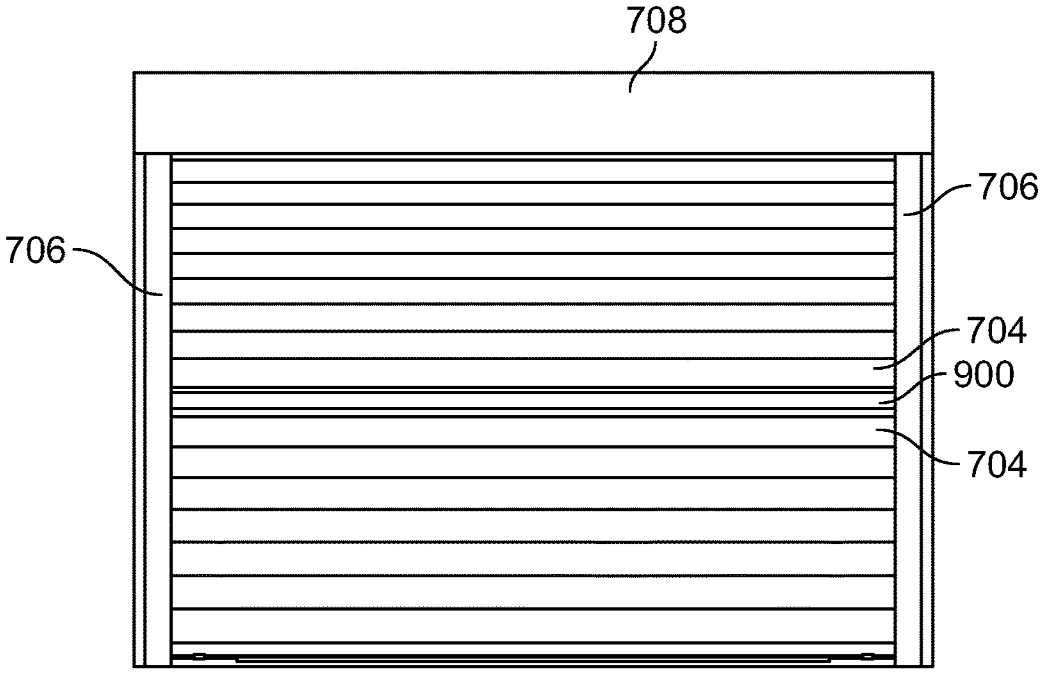
FIG. 37A is a front view of an embodiment of a rolling shutter in an extended position, comprising the utility slat of FIG. 36B.
Figure 37B:
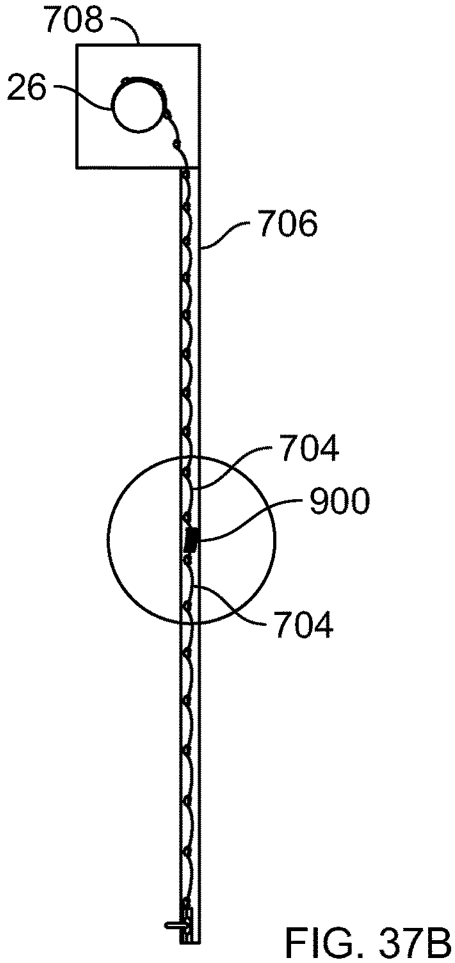
FIG. 37B is a side section view of the rolling shutter of FIG. 37A.
Figure 37C:
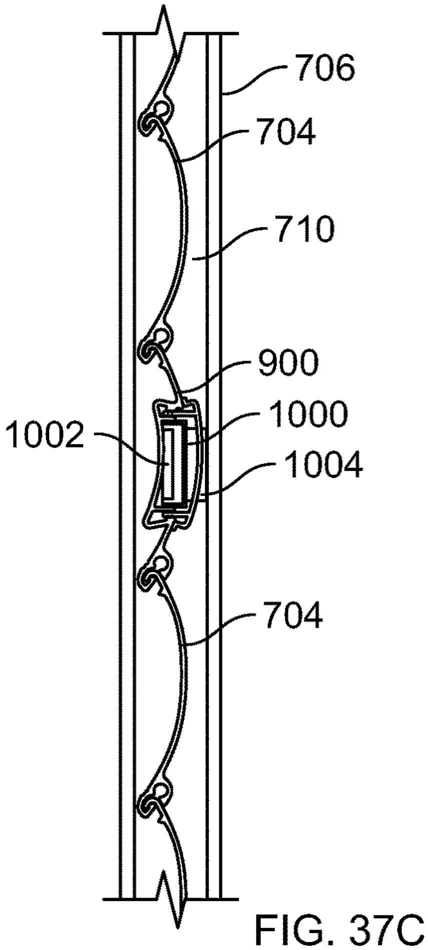
FIG. 37C is a detail, side section view of the rolling shutter of FIG. 37B.

FIGS. 37A-37C show utility slat 900 and locking device 1000 incorporated in a rolling shutter in an extended position, similarly to the rolling shutter system shown in FIGS. 35A-35C. In one embodiment, a locking device 1000 with a sliding lock bar 1002 is positioned at one or both the ends of utility slat 900. In a preferred embodiment, a single locking device 1000 with two lock bars 1002 is positioned in utility slat 900. Those of skill in the art will appreciate that the maximum width of the assembled utility slat 900 and locking device 1000 is less than the width of channel 710, to ensure that the rolling shutter travels freely within guide track 706.

Figure 38A:
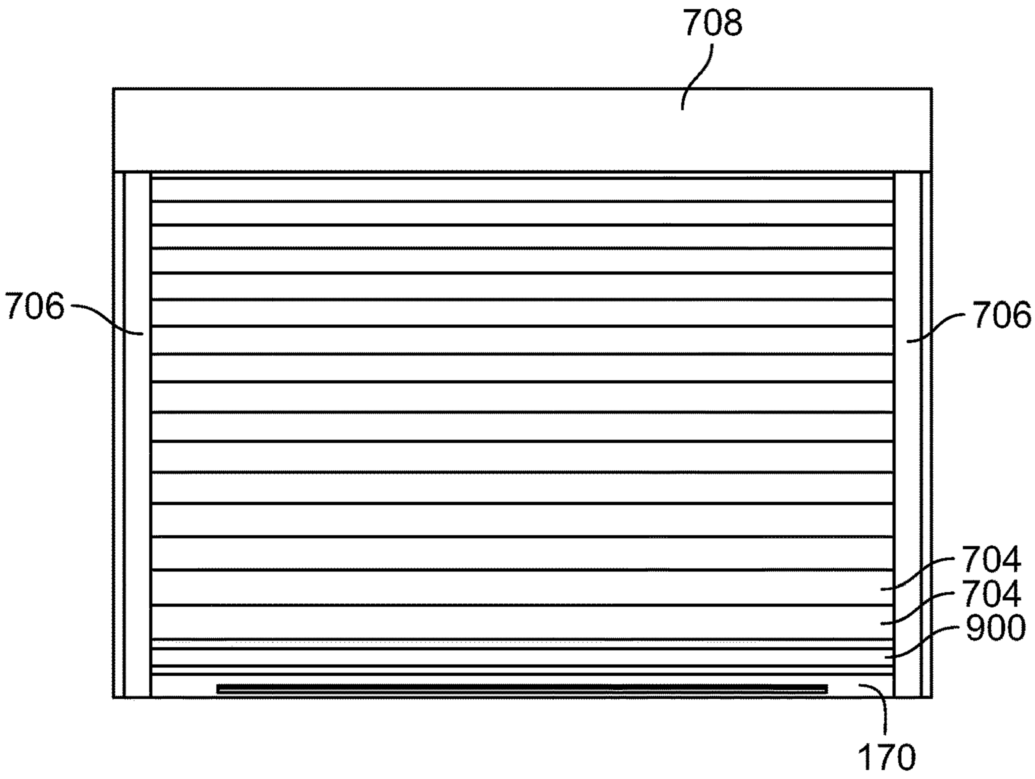
FIG. 38A is a front view of an alternative embodiment of a rolling shutter in an extended position, comprising the utility slat of FIG. 36B.
Figure 38B:
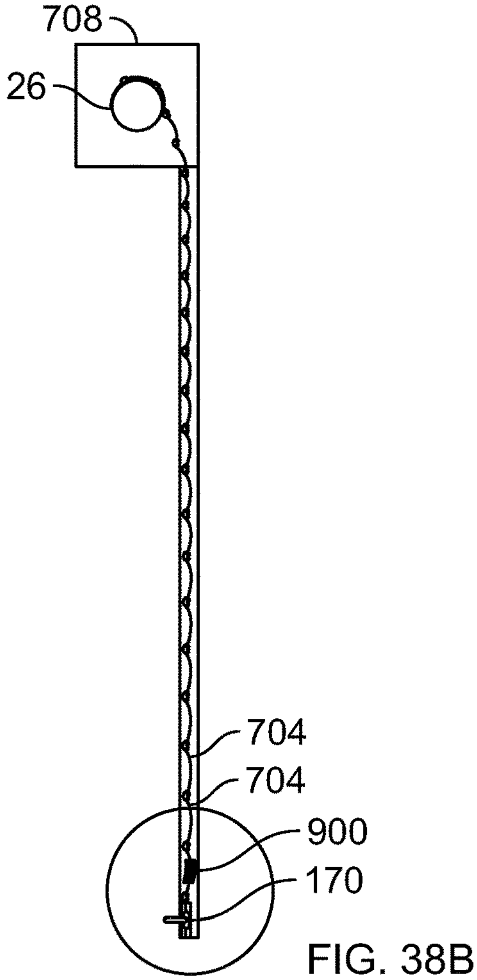
FIG. 38B is a side section view of the rolling shutter of FIG. 38A.
Figure 38C:
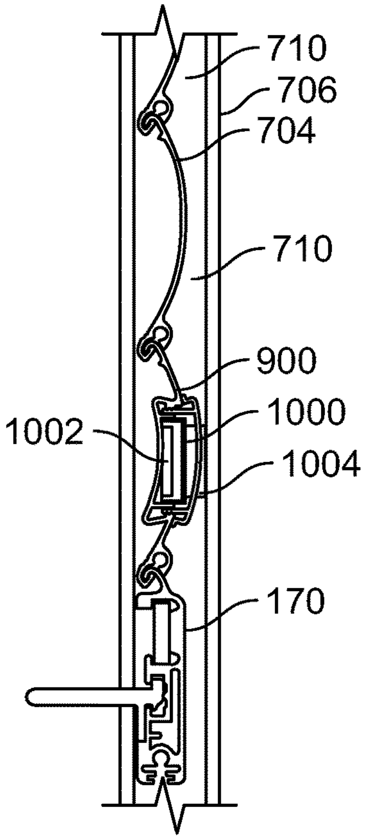
FIG. 38C is a detail, side section view of the rolling shutter of FIG. 38B.

FIGS. 38A-38C show another embodiment of utility slat 900 and locking device 1000 incorporated in a rolling shutter in an extended position. The embodiment of FIGS. 38A-38C is similar to the rolling shutter system shown in FIGS. 37A-37C, except that utility slat 900 and locking device 1000 are positioned near the end of the series of rolling shutter slats 704, adjacent to a base slat (e.g., base slat 170).

Figure 39A:
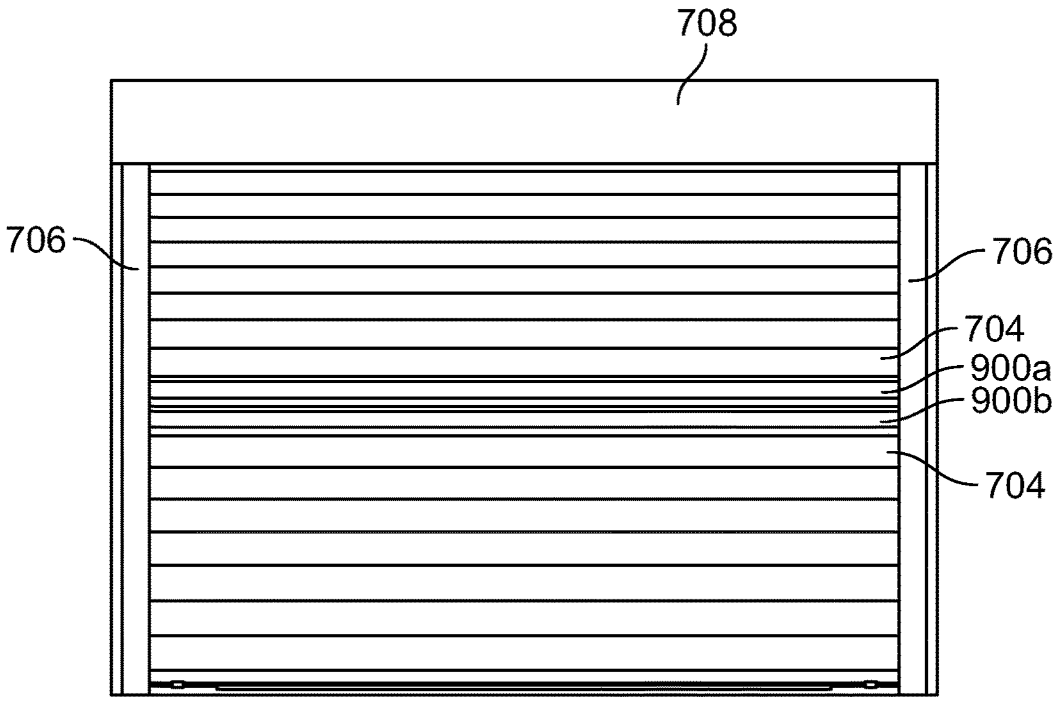
FIG. 39A is a front view of an alternative embodiment of a rolling shutter in an extended position, comprising the utility slats of FIGS. 32B and 36B.
Figure 39B:
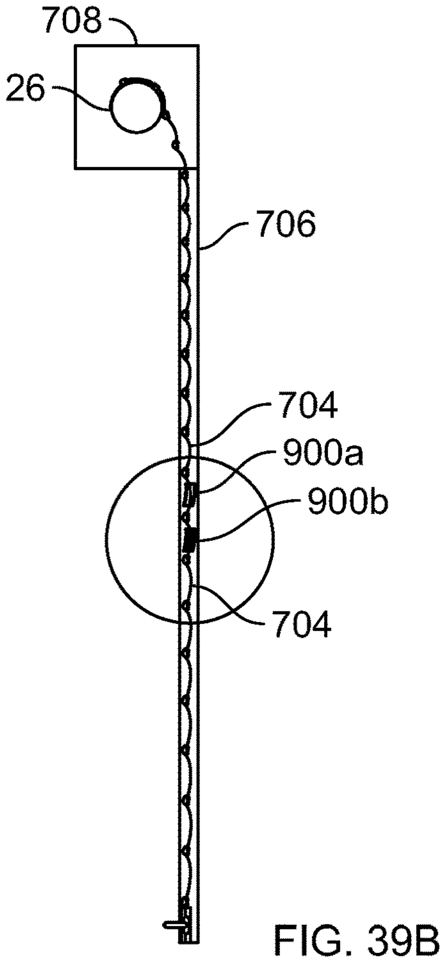
FIG. 39B is a side section view of the rolling shutter of FIG. 39A.
Figure 39C:
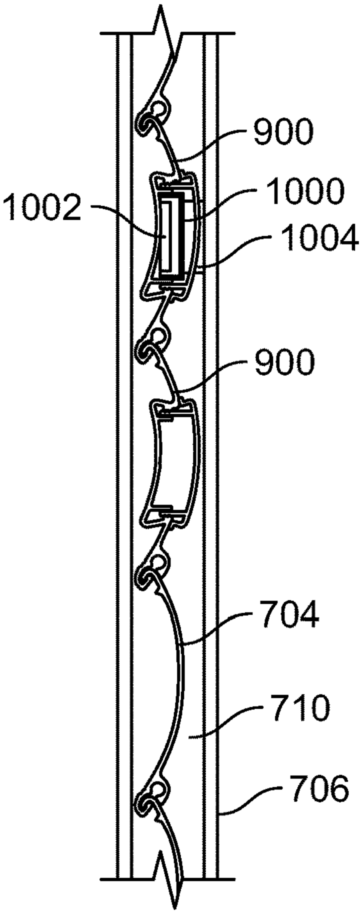
FIG. 39C is a detail, side section view of the rolling shutter of FIG. 39B.

Those of skill in the art will appreciate that the rolling shutter may comprise multiple utility slats 900, that have the same or different functions. FIGS. 39A-39C show an embodiment of two utility slats incorporated in a rolling shutter in an extended position. The embodiment of FIGS. 39A-39C is similar to the rolling shutter system shown in FIGS. 37A-37C, except that two utility slats 900 and 900' are positioned (linked) adjacent to each other, approximately in the middle of the series of rolling shutter slats 704. Utility slats 900 and 900' have identical configurations, except that a locking device 1000 is installed in utility slat 900. In embodiments where utility slats 900 and 900' are positioned at different locations in the rolling shutter (e.g., in the middle and near the end), the two utility slats may be located in different windings and have different heights, as described above. For example, a utility slat 900 positioned at the middle of the series of rolling shutter slats may have a similar configuration to slat 900*a* (FIG. 33B), and a utility slat 900' positioned at the end of the series of rolling shutter slats (further from the spindle) may have a similar configuration to slat 900*c* (FIG. 33C).

Utility slat 900 may include a protective feature to reduce the risk of damage to the finish of the slats in the rolling shutter, such as a protective spacer that reduces contact between the utility slat and the other slats in the rolling shutter. Mechanisms such as locking device 1000 will typically project from utility slat cover 904 to allow a user to access and operate the device. During retraction of the rolling shutter, repeated contact between locking device 1000 and the slats in adjacent windings may cause wear or damage to the finish of the slats. In one embodiment, utility slat 900 may include a protective spacer such as a housing or bumper to reduce the risk of contact with other slats. The protective spacer is preferably made of relatively soft and resilient materials as are known in the art, such as plastic, rubber, or silicone.

Figure 40A:
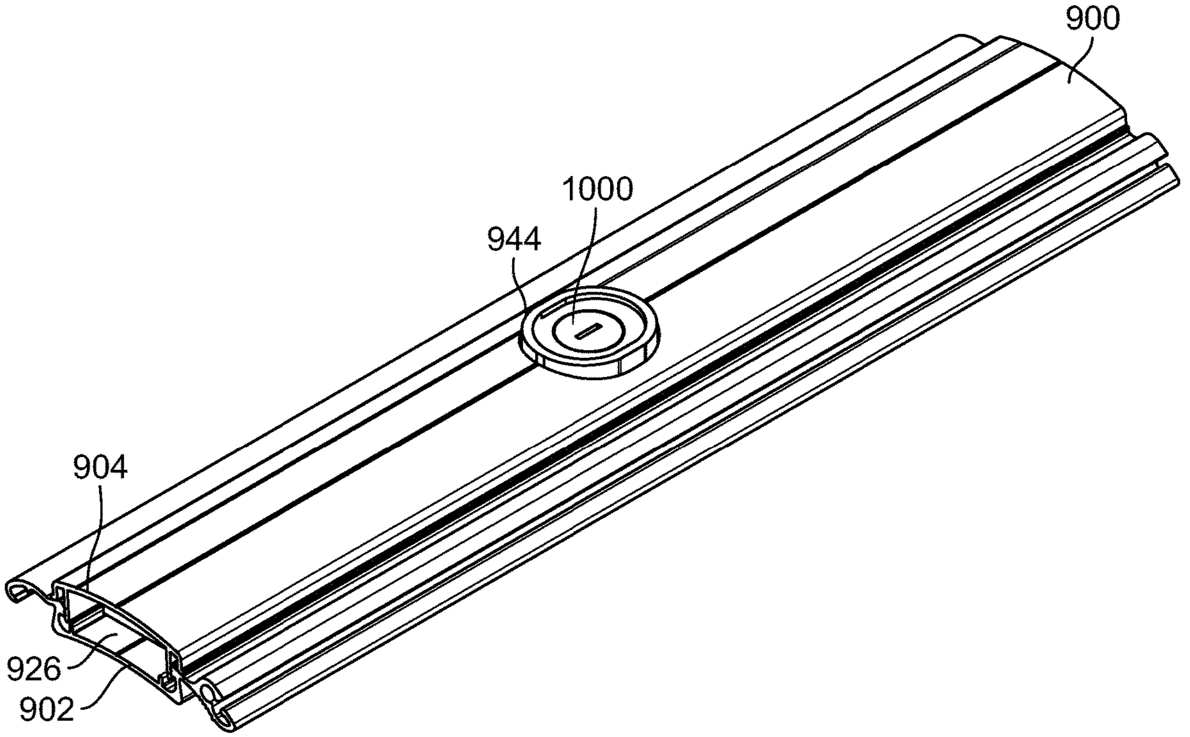
FIG. 40A is an isometric view of an embodiment of a modular utility slat and lock, with a protective housing.
Figure 40B:
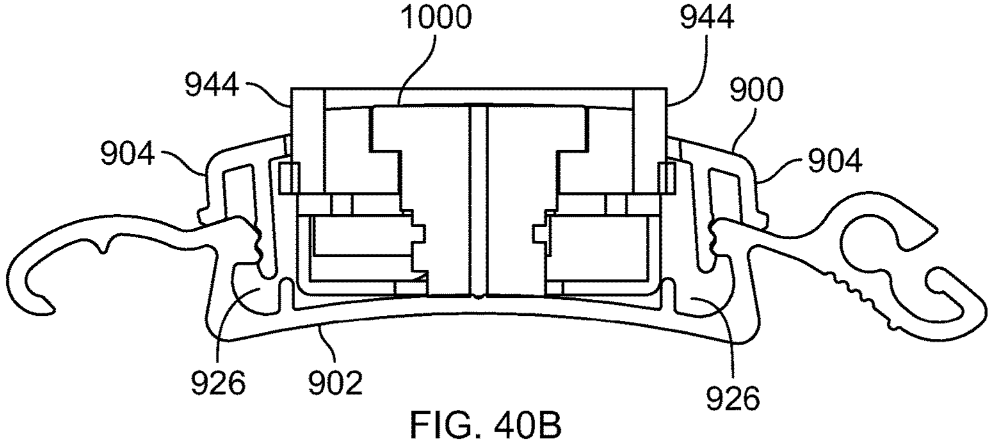
FIG. 40B is a side section view of the modular utility slat, lock, and protective housing of FIG. 40A.

FIGS. 40A and 40B show an embodiment of a utility slat 900 and locking device 1000 with a protective spacer 944. Locking device 1000 is positioned in utility slat interior space 926 and has an exposed portion that projects from an opening in cover 904 above cover outer surface 934. Protective spacer 944 is a housing that is sized and shaped to receive the exposed portion of locking device 1000. In one embodiment, housing 944 is a collar that surrounds and conforms to the exposed portion of locking device 1000. Housing 944 projects from utility slat cover 904 at a height above cover outer surface 934 that is greater than the height of the exposed portion of locking device 1000, to protect against contact between the locking device and other slats. In a preferred embodiment, housing 944 extends into interior space 926, and the opening in cover 904 is sized and shaped to receive both the exposed portion of locking device 1000 and housing 944.

Figure 41A:
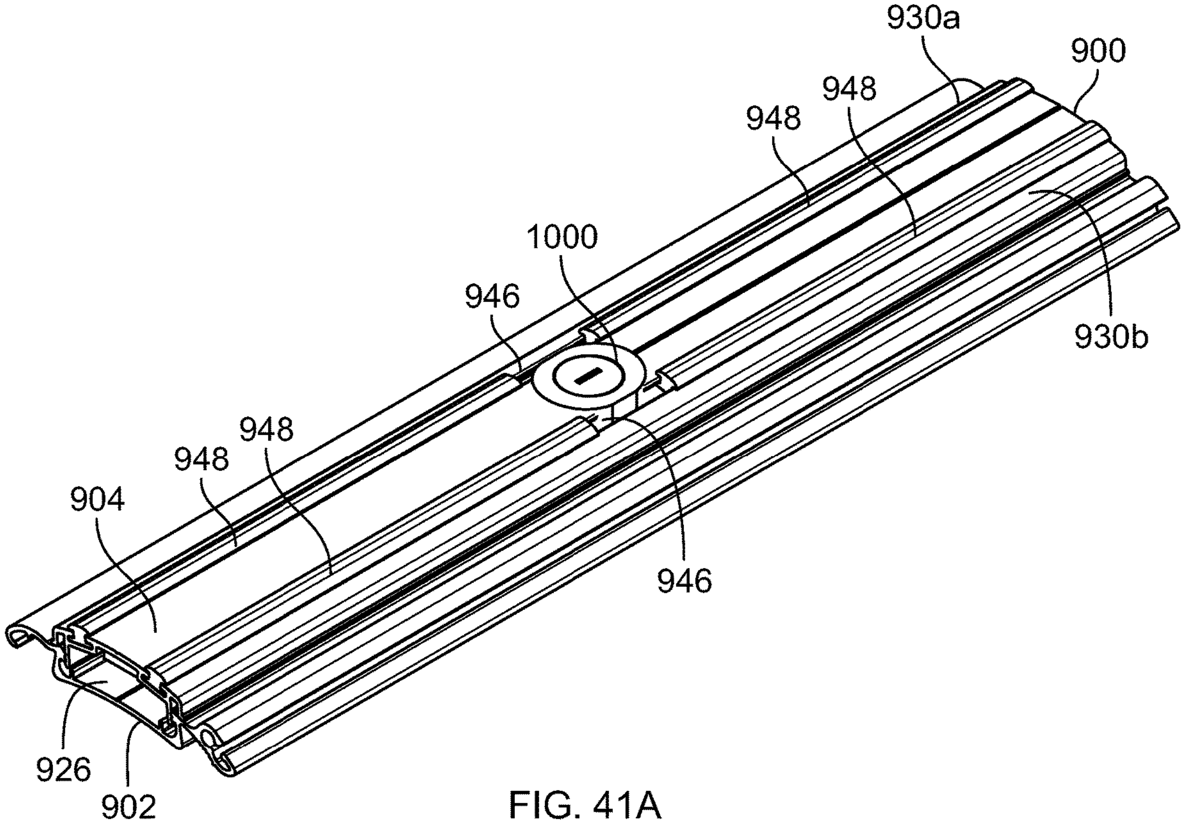
FIG. 41A is an isometric view of an embodiment of a modular utility slat and lock, with a wear strip.
Figure 41B:
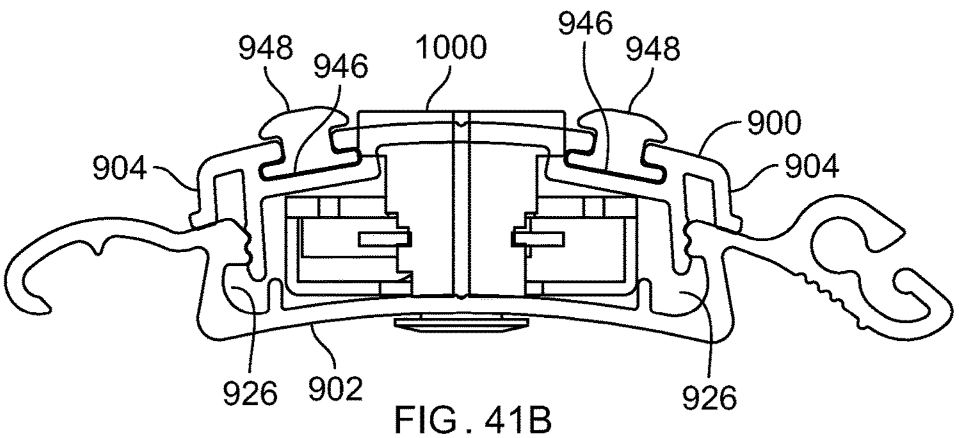
FIG. 41B is a side section view of the modular utility slat, lock, and wear strip of FIG. 41A.

FIGS. 41A and 41B show an alternative embodiment of a utility slat 900 and locking device 1000 with a protective spacer 948. Locking device 1000 is similarly positioned in utility slat interior space 926 and has an exposed portion that projects from an opening in cover 904. Protective spacer 948 is a bumper or wear strip positioned on and projecting above cover outer surface 934. In one embodiment, wear strip 948 is positioned at one or both ends 930*a* and 930*b* of utility slat cover 904, and extends longitudinally on one or both sides of locking device 1000. Similarly to housing 944, wear strip 948 also projects above cover outer surface 934 at a height greater than the height of the exposed portion of locking device 1000, to protect against contact between the locking device and other slats. In one embodiment, utility slat cover 904 has one or more channels 946 that are sized and shaped to receive one or more wear strips 948. Channels 946 are preferably positioned at ends 930*a* and 930*b* of utility slat cover 904, and extend longitudinally on either side of locking device 1000. Wear strips 948 are removably secured in channels 946. For example, channels 946 and wear strips 948 may be configured for snap fit insertion of the wear strips in the channels.

Those of skill in the art will appreciate that housing 944 and bumpers 948 are not limited to locking device 1000, but may be adapted to protect other features that project from the profile of a rolling shutter slat and may cause abrasion or wear from contact with other slats. For example, housing 944 and bumpers 948 may be adapted for use with a finger pull slat 100 (FIG. 11).

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A utility slat for a rolling shutter, comprising:

a single-walled slat body having a slat inner surface with a concave curvature, a slat outer surface with a convex curvature, and first and second edges;

an engaging track positioned at the first edge;

a receiving track positioned at the second edge, and configured to receive the engaging track of another slat;

a U-shaped channel formed in the slat body and projecting from the concave slat inner surface, comprising a channel base and first and second channel walls that define an interior space, the first and second channel walls each projecting from the slat inner surface and having an end opposite the channel base that is positioned at the slat body; and an opening into the interior space in the slat outer surface, the opening defined between the ends of the first and second channel walls; and a cover removably coupled to the slat body to enclose the interior space, the cover having a cover outer surface, and a cover opening in the cover outer surface into the interior space;

a spacer positioned on the cover, that projects above the cover outer surface; and a locking device positioned in the interior space for securing the rolling shutter, the locking device having an exposed portion extending from the cover opening and projecting above the cover outer surface at a first height;

wherein the spacer projects above the cover outer surface at a second height that is greater than the first height.

2. The utility slat of claim 1, wherein the channel projects from the slat inner surface to form a grip that facilitates manual raising and lowering of the rolling shutter.

3. The utility slat of claim 2, wherein each of the first and second channel walls have a channel wall outer surface that is contiguous with the slat inner surface; and wherein an acute angle is formed between at least one of the channel wall outer surfaces and the slat inner surface.

4. The utility slat of claim 1, wherein the channel base has a base outer surface opposite the interior space, wherein the base outer surface has a concave curve that is approximately concentric with the concave curvature of the slat inner surface.

5. The utility slat of claim 1, wherein the cover has a cover body with a cover inner surface, the cover inner surface facing the interior space; and wherein the cover outer surface has a convex curve that is approximately concentric with the convex curvature of the slat outer surface.

6. The utility slat of claim 1, wherein the cover has first and second cover ends that are respectively removably coupled to the first and second channel wall ends to enclose the interior space.

7. The utility slat of claim 6, wherein the first and second cover ends are coupled to the first and second channel wall ends by interference fit.

8. The utility slat of claim 6, wherein the cover comprises first and second cover flanges respectively positioned at the first and second cover ends; and wherein the first and second cover flanges are respectively removably coupled to the first and second channel wall ends.

9. The utility slat of claim 8, wherein the channel base has first and second base ends, and first and second channel flanges respectively positioned at the first and second base ends and that project into the interior space;

wherein the first channel flange and first wall end are spaced apart to define a first aperture, and the second channel flange and second wall end are spaced apart to form a second aperture; and wherein the first and second apertures are sized and shaped to respectively receive the first and second cover flanges.

10. The utility slat of claim 1, wherein the cover is U-shaped and comprises:

a cover body, with first and second cover body ends; and first and second cover walls respectively extending from the first and second cover body ends, the first and second cover walls respectively having first and second cover wall ends opposite the cover body;

wherein the first and second cover wall ends are configured to contact the slat body when the cover is removably coupled to the slat body.

11. The utility slat of claim 10, the first and second cover walls form a grip at the slat outer surface that facilitates manual raising and lowering of the rolling shutter.

12. A utility slat for a rolling shutter, comprising:

a single-walled slat body having a slat inner surface with a concave curvature, a slat outer surface with a convex curvature, and first and second edges;

a U-shaped channel formed in the slat body, comprising a channel base and first and second channel walls that define an interior space, and an opening in the slat outer surface into the interior space, the opening defined between the first and second channel walls;

a cover removably coupled to the slat body to enclose the interior space, the cover having a cover outer surface, and a cover opening in the cover outer surface into the interior space;

a spacer positioned on the cover, that projects above the cover outer surface;

a locking device positioned in the interior space for securing the rolling shutter, the locking device having an exposed portion extending from the cover opening and projecting above the cover outer surface at a first height;

wherein the spacer projects above the cover outer surface at a second height that is greater than the first height.

13. The utility slat of claim 12, wherein the spacer is a housing that is sized and shaped to receive the exposed portion of the locking device.

14. The utility slat of claim 12, wherein the spacer is a longitudinal strip secured to the cover.

* * * * *